(12) United States Patent
Gentili

(10) Patent No.: US 12,550,808 B2
(45) Date of Patent: Feb. 17, 2026

(54) DEVICE FOR SHAPING A FURROW PROFILE, SENSING SOIL PROPERTIES AND DOSING FLUIDS

(71) Applicants: Jorge A. Gentili, Prov. de Santa Fe (AR); PLANTIUM S.A., Prov. de Santa Fe (AR)

(72) Inventor: Franco A. Gentili, Prov. de Santa Fe (AR)

(73) Assignees: PLANTIUM S.A., Prov. de Santa Fe (AR); Jorge A. Gentili, Prov. de Santa Fe (AR)

( * ) Notice: Subject to any disclaimer, the term of this patent is extended or adjusted under 35 U.S.C. 154(b) by 441 days.

(21) Appl. No.: 18/026,277

(22) PCT Filed: Sep. 30, 2020

(86) PCT No.: PCT/IB2020/059175
§ 371 (c)(1),
(2) Date: Mar. 14, 2023

(87) PCT Pub. No.: WO2022/069921
PCT Pub. Date: Apr. 7, 2022

(65) Prior Publication Data
US 2023/0354736 A1 Nov. 9, 2023

(51) Int. Cl.
*A01C 5/06* (2006.01)
*A01C 5/02* (2006.01)
(Continued)

(52) U.S. Cl.
CPC ................ *A01C 5/02* (2013.01); *A01C 7/06* (2013.01); *A01C 21/002* (2013.01); *A01C 21/007* (2013.01); *A01C 23/025* (2013.01)

(58) Field of Classification Search
CPC ......... A01C 5/062; A01C 7/06; A01C 21/002; A01C 21/007; A01C 23/025
See application file for complete search history.

(56) References Cited

U.S. PATENT DOCUMENTS 9,585,301 B1 * 3/2017 Lund ...................... A01C 21/00
9,675,005 B1 * 6/2017 Bergmeier ............. A01C 5/062
(Continued)

FOREIGN PATENT DOCUMENTS

WO   WO-2014/183182 A1   11/2014
WO   WO-2015/171908 A1   11/2015
WO   WO-2016/205422 A1   12/2016

*Primary Examiner* — Matthew R Buck
(74) *Attorney, Agent, or Firm* — MUNCY, GEISSLER, OLDS & LOWE, P.C.

(57) ABSTRACT

Device for shaping the profile of a furrow, sensing soil properties and dosing fluids in the soil of an agricultural field, includes a body comprising an upper portion and lower portion defining a right lateral face and a left lateral face that are laterally opposite, a front face and a rear face that are longitudinally opposite, and an upper face and lower face that are vertically opposite, wherein the laterally opposite faces at the lower portion of the body are angled relative to a vertical direction forming a V-shaped profile cross section for V-shaping furrows; damping and biasing means linked to the upper face of the body; a fluid dosing conduit including an inlet and an outlet, and being longitudinally arranged within the body; sensing means on a face of the body for measuring soil properties; and a sensing unit for commanding the sensing means and receiving information thereof.

20 Claims, 24 Drawing Sheets

(51) Int. Cl.
   *A01C 7/06*   (2006.01)
   *A01C 21/00*  (2006.01)
   *A01C 23/02*  (2006.01)

(56) References Cited

U.S. PATENT DOCUMENTS

| | | | |
|---|---|---|---|
| 10,257,973 B2 * | 4/2019 | Hubner | A01C 5/062 |
| 2009/0262003 A1 * | 10/2009 | Allan | A01C 23/026 |
| | | | 111/123 |
| 2013/0000534 A1 * | 1/2013 | Schaffert | A01C 15/008 |
| | | | 111/120 |

\* cited by examiner

DEVICE FOR SHAPING A FURROW PROFILE, SENSING SOIL PROPERTIES AND DOSING FLUIDS

CROSS REFERENCE TO RELATED APPLICATION

This application is a national stage application of co-pending Application No. PCT/IB2020/059175, filed on Sep. 30, 2020, the entire contents of which is hereby incorporated by reference.

FIELD OF THE INVENTION

The present invention relates to the technical field of precision agriculture. More particularly, the present invention is related to a device for shaping a furrow profile, sensing soil properties and dosing fluids in the soil of an agricultural field.

BACKGROUND OF THE INVENTION

It is well known in the precision agriculture field that when furrows are made in the soil to be sown by means of furrow opening discs, it is necessary for these furrows to have a V-shape so that the seeds that are then deposited, for example, through a seed tube or other mechanism, are deposited at the lower vertex of the V-shaped furrow. In this way, the seeds are subsequently pressed against the bottom of the furrow by means of a seed firmer so that they are well inserted in the lower vertex of the furrow and effectively come into contact with the moisture in the soil.

A problem that usually occurs when the furrow opening discs are widely spaced apart or show an appreciable degree of wear is that a W-shape furrow is formed instead of a V-shape furrow. This problem causes that the deposited seeds do not achieve good contact with the soil, causing the seeds to have little contact with water or soil moisture, thus considerably hindering their germination.

It is also important to carry out the sensing or measurement of the properties of the soil in order to know the characteristics thereof, to prepare the soil, for example, by dosing water, fertilizers, biological compounds, etc., as well as to know the suitable locations for depositing seeds so that they can properly grow.

This is why there are prior art documents such as U.S. Pat. No. 10,257,973 B2 in the name of Deere and Company, which describes a planter row unit that has a furrow shaper. This furrow shaper is located between the furrow opener and the seed delivery mechanism, which may be a seed tube. The furrow shaper is thus located in front of the seed delivery mechanism.

The furrow shaper described in U.S. Pat. No. 10,257,973 B2 has a triangular shape, is configured to shape the bottom of the furrow in order for the latter to have a V-shaped cross section and has a spring that ensures contact with the bottom of the furrow. It may also comprise sensors to measure various soil properties before delivering a seed to the furrow.

Patent application WO 2016/205422 A1, in the name of Precision Planting LLC, describes a system, method and apparatus for monitoring soil properties including soil moisture, soil electrical conductivity and soil temperature. In addition, the soil properties monitoring apparatus has a camera that transmits images that can be used to determine different agronomic properties, which can be georeferenced and allows mapping of the different measured soil properties.

The devices known in the state of the art are rustic and not very effective as they have few measuring tools and are therefore not very accurate. Further, there is no device in the state of the art that simultaneously allows V-shaping a furrow, sensing soil properties and applying agrochemical liquids in real time, taking into account the points sensed, wherein said device is economical, effective and fast when measuring soil properties in order to benefit the growth of the crops, and can be easily mounted on different agricultural vehicles such as autonomous vehicles.

Consequently, there is a need of providing a device that simultaneously allows V-shaping the profile of a furrow, sensing properties in the furrow soil, and dosing liquids into the furrow in an agricultural field.

BRIEF DESCRIPTION OF THE INVENTION

Based on the above considerations, the present invention provides a device that allows simultaneously shaping the profile of a furrow, sensing properties in the furrow soil, and dosing compounds into the furrow in an agricultural field, wherein said device can be mounted on different vehicles or agricultural machines, such as autonomous vehicles or robots. More particularly, the present invention describes a device which is compact, light, practical and easy to mount, comprising various functions such as V-shaping the furrow profile, measuring a wide range of soil properties accurately, and also dosing liquids and semi-liquids automatically and accurately according to the measurements obtained, among other functions.

Therefore, it is an object of the present invention a device for shaping the profile of a furrow, sensing soil properties and dosing fluids into the soil of an agricultural field, comprising:

a body comprising an upper portion and lower portion defining a right lateral face and a left lateral face that are laterally opposite, a front face and a rear face that are longitudinally opposite, and an upper face and lower face that are vertically opposite, wherein the laterally opposite faces at the lower portion of the body are angled relative to a vertical direction forming a V-shaped profile cross section for V-shaping furrows;

damping and biasing means linked to the upper face of the body;

at least one fluid dosing conduit comprising an inlet and an outlet, and being longitudinally arranged within the body;

sensing means on at least one face of the body for measuring soil properties; and a sensing unit for commanding the sensing means and receiving information thereof.

In an embodiment of the present invention, the laterally opposite faces at the lower portion are angled between 5° and 25° relative to a vertical direction.

In an embodiment of the present invention, the damping and biasing means comprise a helical spring and a damper.

In an embodiment of the present invention, the damping and biasing means comprise a damper.

In an embodiment of the present invention, the damping and biasing means comprise a coupling arm and a support arm, wherein the coupling arm comprises two parallel and spaced apart bars that are linked to the body at one end and each has a through-hole at another end, and wherein the support arm is between the parallel bars of the coupling arm supporting the latter and has a through-hole collinear with the coupling arm holes, thereby forming together a space that defines a pivoting axis and comprises a rubber bushing or a metal torsion spring.

In an embodiment of the present invention, the damping and biasing means comprise a coupling arm, a support arm and a rod with a spring, wherein the coupling arm comprises two parallel and spaced apart bars that are linked to the body at one end and each has a through-hole at a middle part thereof, wherein the support arm is between the parallel bars of the coupling arm supporting the latter and has a through-hole collinear with the coupling arm holes thereby forming together a space that defines a pivoting axis and wherein other ends of the parallel bars make contact with the rod spring.

In an embodiment of the present invention, the device is mounted on a planter row unit, autonomous terrestrial robot or other agricultural vehicle.

In a preferred embodiment of the present invention, the device is linked to the seed tube of a planter row unit, preferably in front of the seed tube, wherein the placement of the device in the seed tube allows shaping the furrow profile, sensing soil properties, and dosing fluids into the soil before depositing the seed into the furrow.

In an embodiment of the present invention, the sensing means comprise one or more components selected from the following group: sensors for measuring electrical properties of the soil such as the impedance (conductance, capacitance and inductance); radiation emitters and receptors in the visible and near-infrared (NIR) radiation spectrum; contact or non-contact surface temperature sensors; electrochemical sensors and an inertial measurement unit.

In an embodiment of the present invention, the electrochemical sensors comprise a wetting system and a protection system.

In an embodiment of the present invention, the electrochemical sensors are ISFET sensors.

In an embodiment of the present invention, the device allows measuring the amount of organic matter, moisture, nitrogen, potassium, sulphur, zinc, calcium, magnesium, phosphorus, sodium, chlorine, iron, clay, sand, silt, crop residues, salinity, conductivity, pH and soil temperature.

In an embodiment of the present invention, the sensing means are placed on the laterally opposite faces, on the front face, on the rear face and on the lower face of the body.

In an embodiment of the present invention, the at least one dosing conduit doses water or agrochemicals in liquid or semi-liquid form.

In an embodiment of the present invention, the at least one dosing conduit comprises at the outlet fluid diffusion means, preferably a nozzle.

In an embodiment of the present invention, the at least one dosing conduit is in fluid communication with an injection system and at least one reservoir, which allow the dosing and storage, respectively, of the fluids.

In an embodiment of the present invention, the at least one dosing conduit is diagonally and downwardly arranged within the body, from the front face to the rear face.

In an embodiment of the present invention, the body is made of a metallic material, such as a friction and oxidation resistant metal alloy; or made of a polymeric material such as an impact and friction resistant polymer; or of a combination of metallic material and polymeric material.

In an embodiment of the present invention, the sensing unit sends the information received to a processing unit for processing and storing said information.

In an embodiment of the present invention, the data communication between the sensing unit and the processing unit is either wired or wireless.

In an embodiment of the present invention, the sensing unit is a microcontroller.

In an embodiment of the present invention, the information received by the processing unit is processed by machine learning methods, such as artificial neural networks.

In an embodiment of the present invention, the processing unit is in data communication with a GPS/GNSS module that allows georeferencing each of the obtained measurements.

In another aspect of the invention, a seed drill agricultural vehicle comprising a device for shaping the profile of a furrow, sensing soil properties and dosing fluids into the soil is provided, wherein said device comprises:

a body comprising an upper portion and lower portion defining a right lateral face and a left lateral face that are laterally opposite, a front face and a rear face that are longitudinally opposite, and an upper face and lower face that are vertically opposite, wherein the laterally opposite faces at the lower portion of the body are angled relative to a vertical direction forming a V-shaped profile cross section for V-shaping furrows;

damping and biasing means linked to the upper face of the body and linked to a seed tube of the agricultural vehicle;

at least one fluid dosing conduit comprising an inlet and an outlet, and being longitudinally arranged within the body;

sensing means on at least one face of the body for measuring soil properties; and a sensing unit for commanding and receiving information from the sensing means.

DETAILED DESCRIPTION OF THE INVENTION

The device of the present invention will be described in detail below with reference to FIGS. 1 to 28 which illustrate exemplary embodiments of the invention and different parts thereof.

The same numerical references are used in each of the figures to designate similar or identical parts of the device of the present invention.

Figure 1:
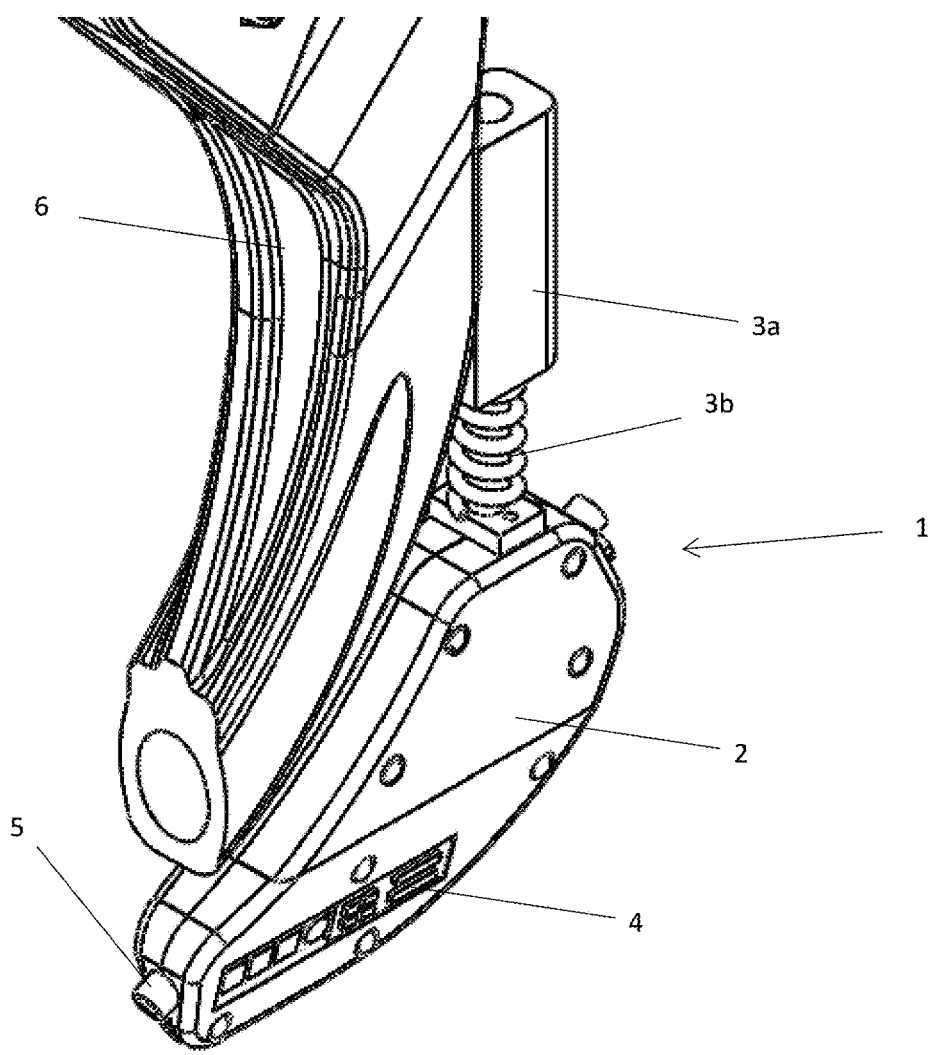
FIG. 1 shows a rear perspective view of an embodiment of the device of the present invention linked to a seed tube.

Referring to FIG. 1, it can be seen a rear perspective view of a preferred embodiment of device 1 linked to a seed tube 6, wherein the device 1 comprises a body 2, damping and biasing means comprising a damper 3a and a spring 3b, sensing means 4 and a conduit 5.

The body 2 comprises an inner volume and has a longitudinal section with a geometric shape similar to a "crescent" as illustrated in the embodiment of FIG. 1. Additionally, body 2 comprises an upper portion and lower portion defining a right lateral face and a left lateral face that are laterally opposite, a front face and a rear face that are longitudinally opposite, and an upper face and lower face that are vertically opposite. The laterally opposite faces at the lower portion of the body are angled relative to a vertical direction so that the lower portion of body 2, when viewed from a longitudinal direction, has a V-shaped profile cross-section along its entire length. Specifically, the laterally opposite faces at the lower portion are angled between 5° and 25° relative to a vertical direction. Thus, the lower face of body 2, due to the V-shaped profile, is narrower than the upper face of body 2. On the other hand, the laterally opposite faces at the upper portion are vertical and parallel to each other.

The geometric shape similar to a "crescent" comprising the body 2 in its longitudinal section is so that the front face of said body 2 is curved to reduce friction and impact with the soil and obstacles as the device 1 is moved forward to shape the furrow.

The laterally opposite faces may or may not be angled relative to a longitudinal direction so that body 2, when viewed from its lower face, also has a V-shaped profile.

It must be noted that, while the embodiment of the body 2 of the device 1 of the present invention is shown in FIG. 1 with a certain geometric shape, said body 2 can have different geometric shapes as long as the device body has a V-shaped profile when viewed from its longitudinal direction.

The device 1 is linked to the seed tube 6 by means of damping and biasing means, which comprise a spring-damper assembly, preferably vertically oriented, comprising a damper 3a and a helical spring 3b, wherein the body of the damper 3a is fixed to the seed tube 6 by means of a mechanical fixation, e.g. by fitting them together. Likewise, the damper 3a is fixed with the upper face of the body 2 through the rod of the damper 3a.

The device 1 can comprise sensing means 4 on one or more of the faces of body 2 for the survey or sensing of soil properties. These sensing means 4 will be described in more detail below.

During a sowing operation, the device 1 makes contact with the soil and, by means of the V-shaped profile of the device 1 when viewed from a longitudinal direction, V-shapes the furrow profile after the furrow has been produced by the furrow opening discs, which are located in front of or on the sides of device 1. The shaping of this V-shaped profile has the benefit of facilitating the seed germination.

The device 1 of the present invention remedies the possible W-shape of a furrow due to the V-shaped profile of the body 2 of device 1. More precisely, by means of said V-shaped profile the body 2 is able to shape the furrow so that it has a V-shape and the seed achieves the best possible location.

Furthermore, as mentioned above, the device 1 may comprise sensing means 4, on one or more of the faces of body 2, which detect and measure different soil properties, as the agricultural vehicle or machine, in which the device of the present invention is mounted, moves in order to determine optimal locations where to deposit a seed and to decide, for example, whether or not it is necessary to inject some agrochemical on the soil that favors the germination of the seeds. FIG. 1 shows the sensing means 4 comprising an electronic board which supports and electrically connects a plurality of components on the right lateral face of the body 2. The body 2 can also comprise sensing means with the same or different components on the left lateral face and even on the lower face, on the rear face and on the curved front face of body 2.

The sensing means 4 of the device of the present invention may comprise one or all of the following components: sensors for measuring electrical properties of the soil such as the impedance (conductance, capacitance and inductance); radiation emitters and receptors in the visible and near-infrared radiation spectrum; contact or non-contact surface temperature sensors; electrochemical sensors, e.g., ISFET sensors, which increase and improve the ability to measure specific nutrients and ions; and an inertial measurement unit, among other possible sensors.

The radiation emitters and receivers and the non-contact temperature sensor can use a sapphire glass protector or some other suitable material in order to provide resistance and transparency. This would provide the sensor-glass-soil interface, wherein the glass would be in contact with the soil, protecting the radiation emitters and receivers and the non-contact temperature sensors.

Figure 9:
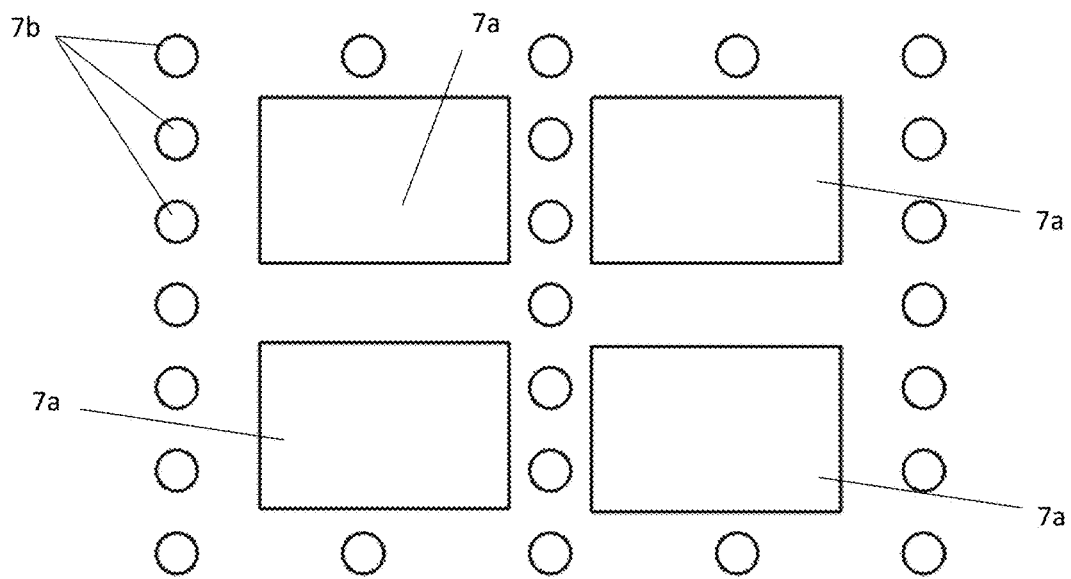
FIG. 9 schematically shows electrochemical sensors surrounded by micropores.

The electrochemical sensors may comprise a wetting system to make the sensors work better and a protection system to protect the sensors, wherein said wetting system continuously doses a very small amount of water through micropores on the surface of the face where the electrochemical sensors are located. FIG. 9 shows a schematic view of electrochemical sensors 7a surrounded by micropores 7b. Further, the electrochemical sensors may comprise a layer of polymer or some other porous material resistant to friction thereon to protect them.

The damping and biasing means allow device 1 to avoid abrupt movements of body 2, and to guarantee the contact of body 2 with the soil, by copying the profile thereof, so as to adequately shape the furrow profile, being able to raise and avoid objects such as stones or logs that obstruct the path. The damping and biasing means may be adjusted to be more tense for improving the shaping of the soil profile.

On the longitudinally opposite faces of body 2 of device 1, a through-hole can be made that passes through the length of body 2 from the front face to the rear face. The purpose of this hole is to allow the insertion of conduit 5, for example, a stainless steel tube, which in turn allows the dosage of water and compounds, such as agrochemicals, into the soil with the aim of enhancing the germination, development and growth of the crops. The compounds that can be dosed through the conduit 5 can be both in liquid and semi-liquid form, for example, gels.

Conduit 5 for water and compound dosage is connected to and in fluid communication with an injection system and at least one reservoir, which allow the dosing and storage, respectively, of water and compounds. It should be noted that body 2, if necessary, may comprise more than one conduit for dosing water and compounds in order to increase the injected volume.

This dosing may be done in a straight path, parallel to the furrow direction, and is done before the seed is deposited in the place where the water or compound dosing was carried out. On the rear face of body 2, where the conduit 5 protrudes in a downward direction from the through-hole, fluid diffusion means, for example a nozzle, may be added so as to spread and cover a larger area with the compounds being injected.

As it is evident, device 1 can inject and dose fluids into the soil through conduit 5 simply to improve soil properties, without having to sow a seed afterwards.

The device 1 of the present invention can be used in different operations such as, for example, in a sowing operation, linking the device to one or more planter row units. More precisely, device 1 can be attached or fixed to, and in front of, the seed tube 6 of a planter row unit, as shown in FIG. 1, so that the device 1 is between the furrow opening discs (not shown) and the seed tube 6. Therefore, the shaping of the furrow profile, the sensing or measurement of soil properties and the dosing of fluids into the furrow occur before the placement of the seed inside the furrow.

It should be noted that device 1 does not necessarily have to be fixed to the seed tube of an agricultural machine but could be fixed in another place depending on the function to be performed. Furthermore, as it will be described below, the device is easily assembled and can be reconfigured to perform all or some of the functions of shaping the furrow profile, sensing or measuring soil properties and dosing fluids into the furrow or soil.

The device 1 of the present invention can also be used in another agricultural vehicle such as a robot or autonomous vehicle (unmanned), and in another type of agronomic operation, for example, in a soil property survey operation, without having to shape the furrow profile and/or inject water or compounds into the soil.

Figure 2:
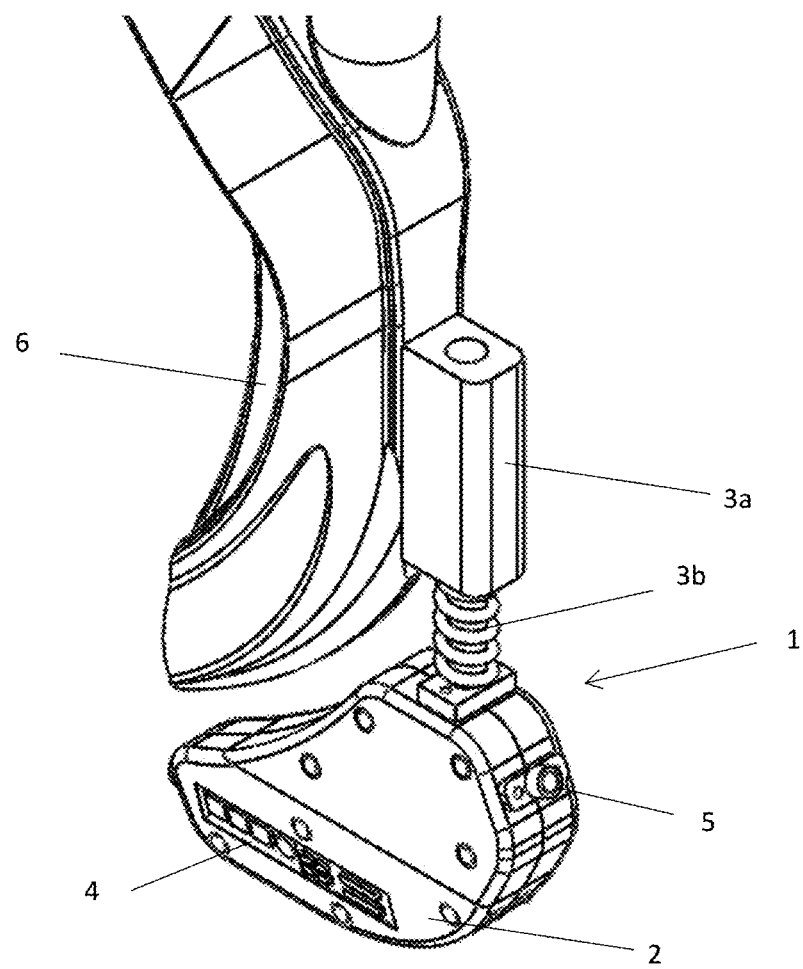
FIG. 2 shows a front perspective view of the embodiment of the device of FIG. 1.

FIG. 2 shows a front perspective view of the embodiment of the device shown in FIG. 1, wherein the curved shape of the front face of device 1 can be seen.

Figure 3:
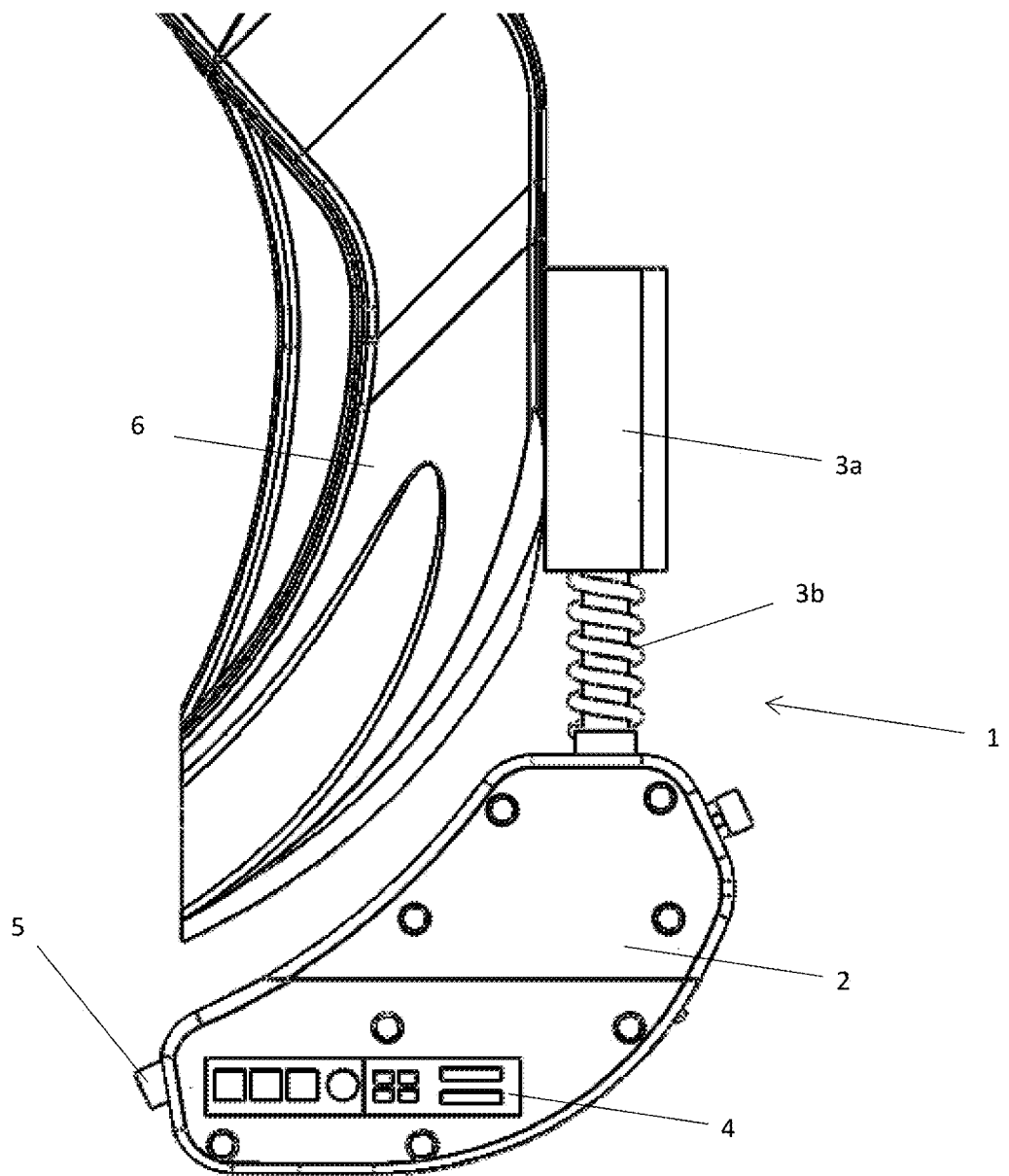
FIG. 3 shows a left-side view of the embodiment of the device of FIG. 1.
Figure 4:
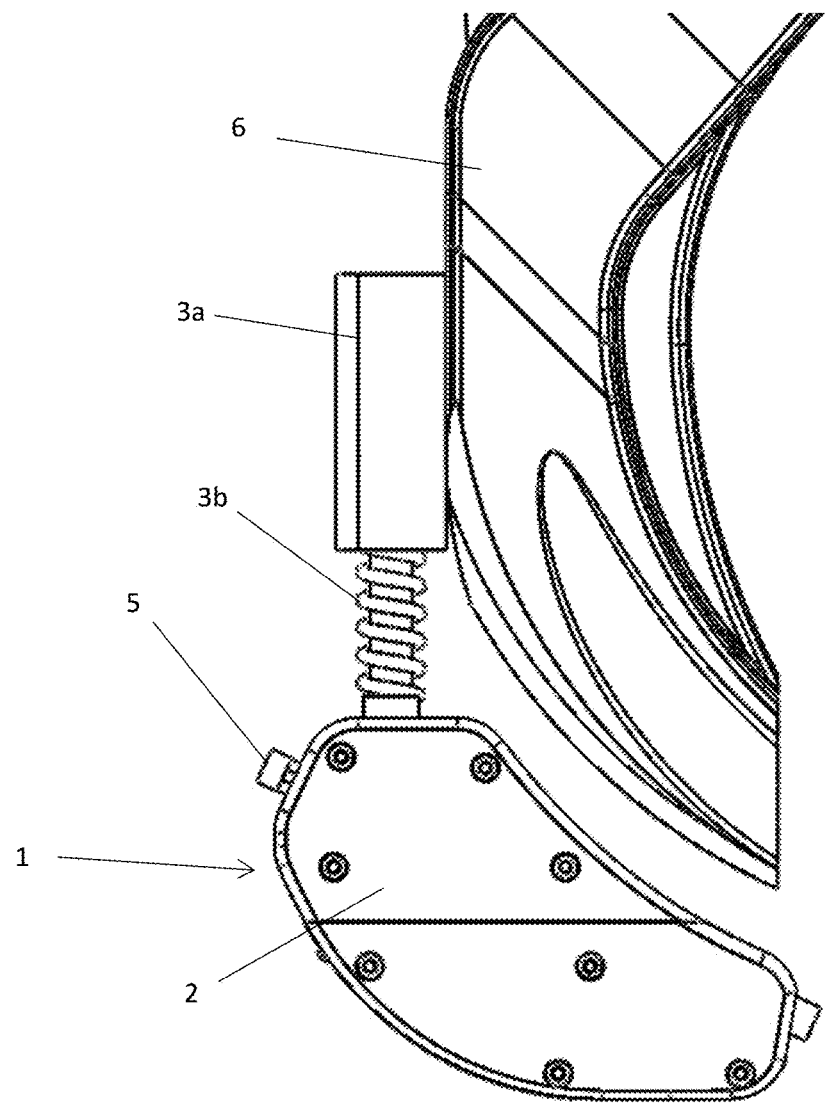
FIG. 4 shows a right-side view of the embodiment of the device of FIG. 1.

FIGS. 3 and 4 show a left-side view and a right-side view, respectively, of the embodiment of the device of FIG. 1. In particular, FIG. 3 shows the right lateral face and the "crescent" shape of body 2 of device 1, wherein said lateral face comprises sensing means 4. On the other hand, FIG. 4 shows the left lateral face which, in this case, does not comprise sensing means but which could be easily incorporated into the surface thereof as mentioned above.

Figure 5:
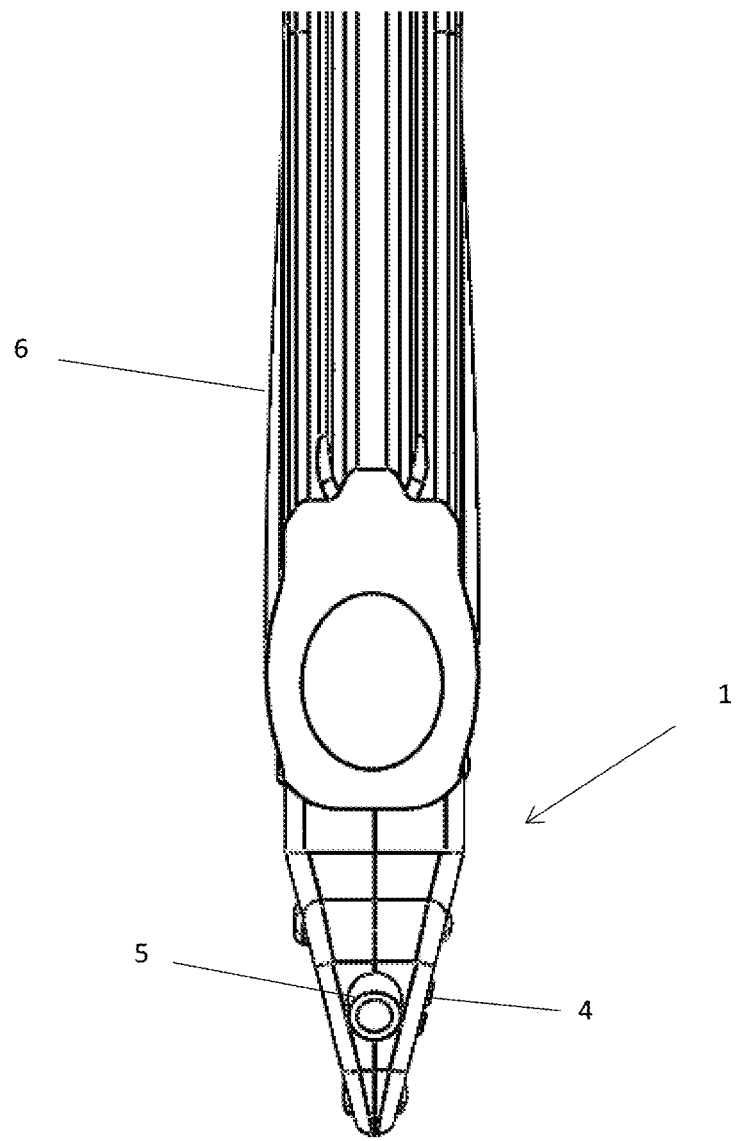
FIG. 5 shows a rear view of the embodiment of the device of FIG. 1.
Figure 6:
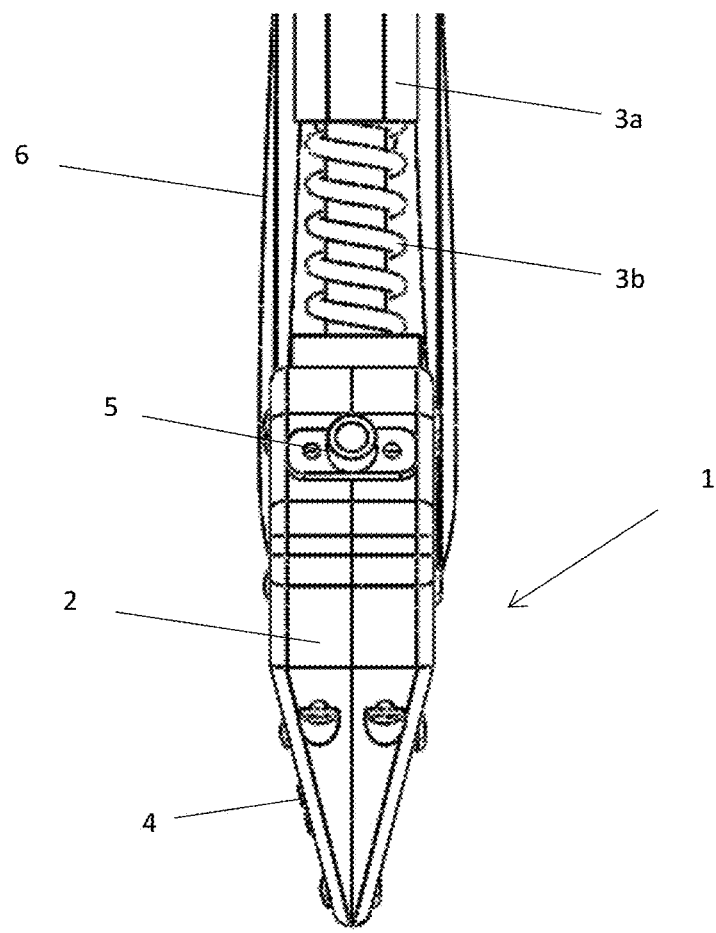
FIG. 6 shows a front view of the embodiment of the device of FIG. 1.

FIGS. 5 and 6 show a rear view and a front view, respectively, of the embodiment of the device of FIG. 1. In particular, in each of FIGS. 5 and 6 it can be seen the inclination of each of the laterally opposite faces at the lower portion of body 2 and how this inclination forms the V-shaped profile of body 2 when viewed from a longitudinal direction.

Figure 7:
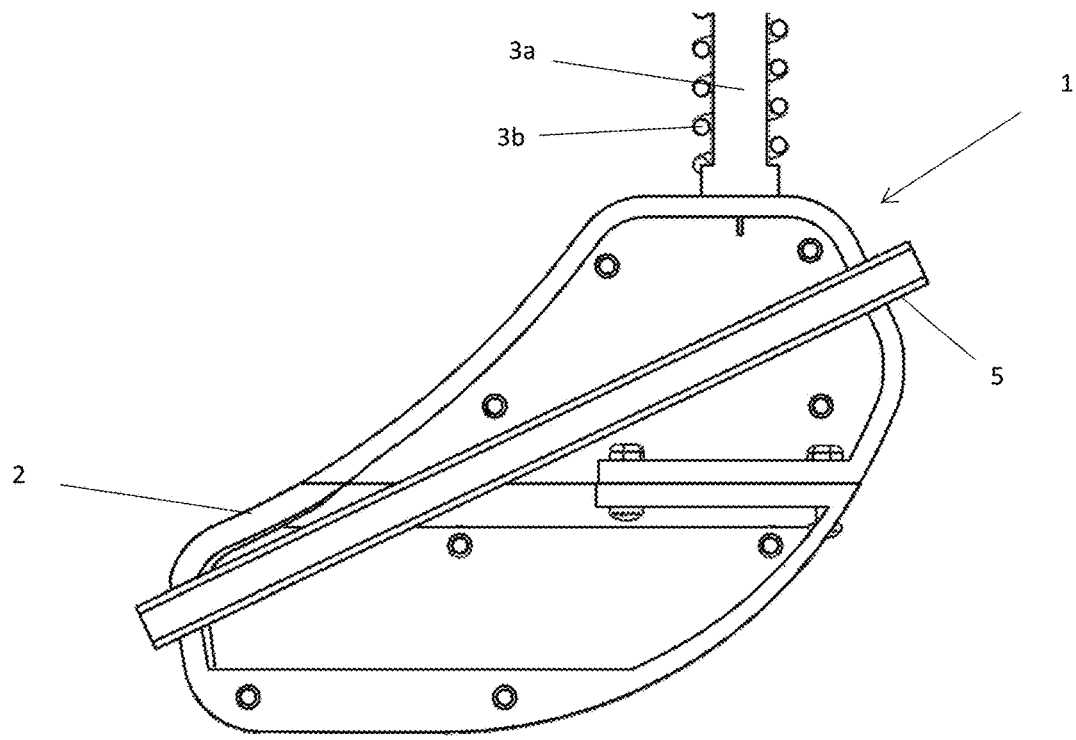
FIG. 7 shows a longitudinal cross-section of the body of the embodiment of the device of FIG. 1.

FIG. 7 shows a longitudinal cross-section of the body 2 of the device 1, in which it can be seen that conduit 5 passes diagonally and longitudinally downwards through the body 2 from the front face to the rear face thereof as described above. It can also be seen the inner volume of body 2 and an example of how the upper portion and lower portion of body 2 are linked.

Figure 8:
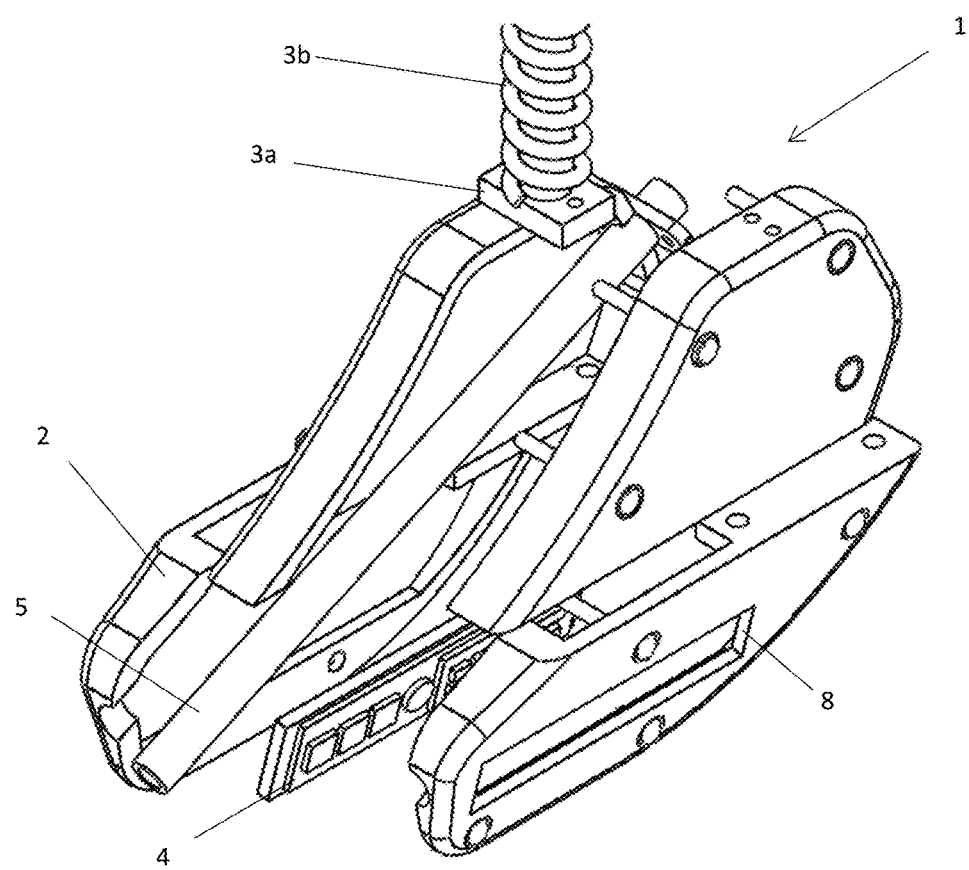
FIG. 8 shows a partially exploded view of the body of the embodiment of the device of FIG. 1.

FIG. 8 shows a partially exploded view of body 2 of device 1, in which it can be seen, by way of example, that both the upper portion and lower portion of body 2 are made up of two pieces that are joined together. In addition, the right lateral face of the lower portion of body 2 has an opening 8 for the placement of the sensing means 4, i.e. for placing and fixing the electronic board of the sensing means 4 inside body 2, and for the components therein to be directed outwards for performing the corresponding measurements. If necessary, corresponding openings can be made on the left lateral face, front face, rear face and lower face of the body 2 to allow the insertion and attachment of other sensing means and to allow the measurement of soil properties at other locations. Also, glass protectors can be attached to said lateral faces to protect the radiation emitters and receivers and to protect the non-contact temperature sensors.

The device 1 is made up of parts that are easily interchangeable to allow easy replacement of parts worn by impact and/or friction. In particular, as described above, both the upper portion and the lower portion of body 2 are made up of two parts that are assembled together, which can be easily replaced by other identical parts, for example, the left lateral face of the lower portion of body 2 could be replaced by an identical part but comprising an opening to allow the placement of sensing means. It should be noted that the sensing means board is also easily replaceable, as are the components it contains. Furthermore, FIG. 8 shows the easy assembly of device 1.

Body 2 of device 1 may be made of a metal alloy with resistance to friction and oxidation or of a polymer resistant to impact and friction and with other mechanical properties, or it may be made of a combination of parts made of different materials, which may be those mentioned above.

Figure 10:
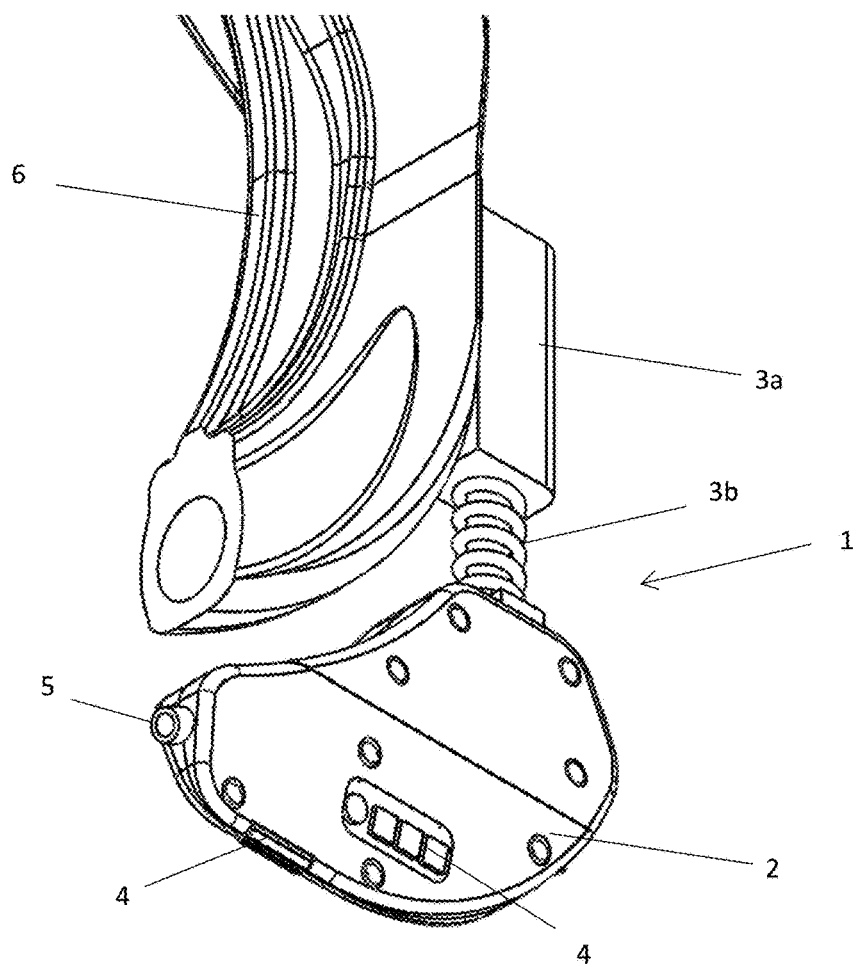
FIG. 10 shows a rear perspective view similar to the embodiment of the device shown in FIG. 1, with the difference that the device has sensing means on other faces.

FIG. 10 shows a rear perspective view similar to the embodiment of the device shown in FIG. 1, with the difference that the device 1 of FIG. 10 has sensing means 4 on other faces. In particular, it can be seen that the right lateral face and the lower face of the body 2 comprise sensing means 4. By way of example, the sensing means 4 on the right lateral face may be radiation receivers and emitters in the visible and near-infrared spectrum and temperature sensors; and the sensing means 4 on the lower face may be soil electrical properties sensors.

Figure 11:
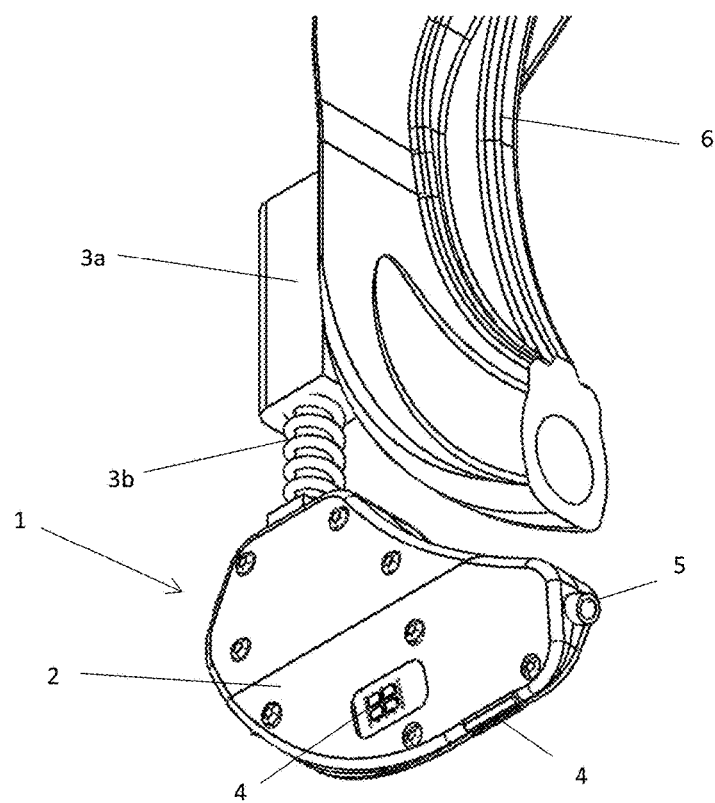
FIG. 11 shows another rear perspective view of the embodiment of the device shown in FIG. 10.

FIG. 11 shows another rear perspective view of the embodiment of the device shown in FIG. 10, wherein it can be seen that the left lateral face also comprises sensing means 4, which may comprise the same or different components as those on the other faces. By way of example, the sensing means 4 on the left lateral face may be electrochemical sensors such as those illustrated in FIG. 9.

Figure 12:
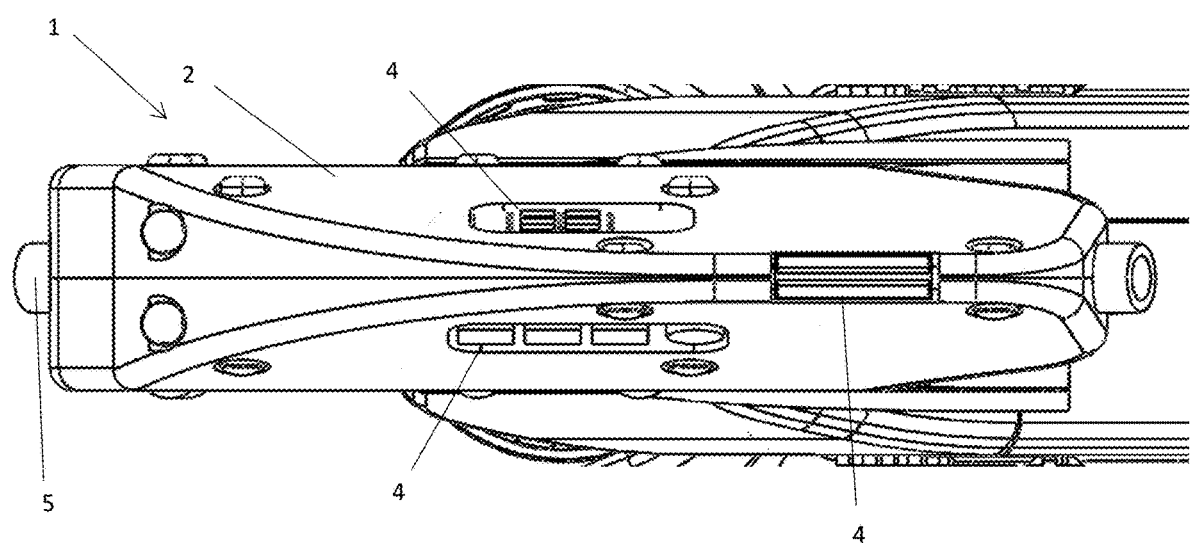
FIG. 12 shows a bottom view of the embodiment of the device shown in FIGS. 10 and 11.

FIG. 12 shows a bottom view of the embodiment of the device shown in FIGS. 10 and 11, wherein sensing means 4 can be seen on the right and left lateral faces of device 1.

Figure 13:
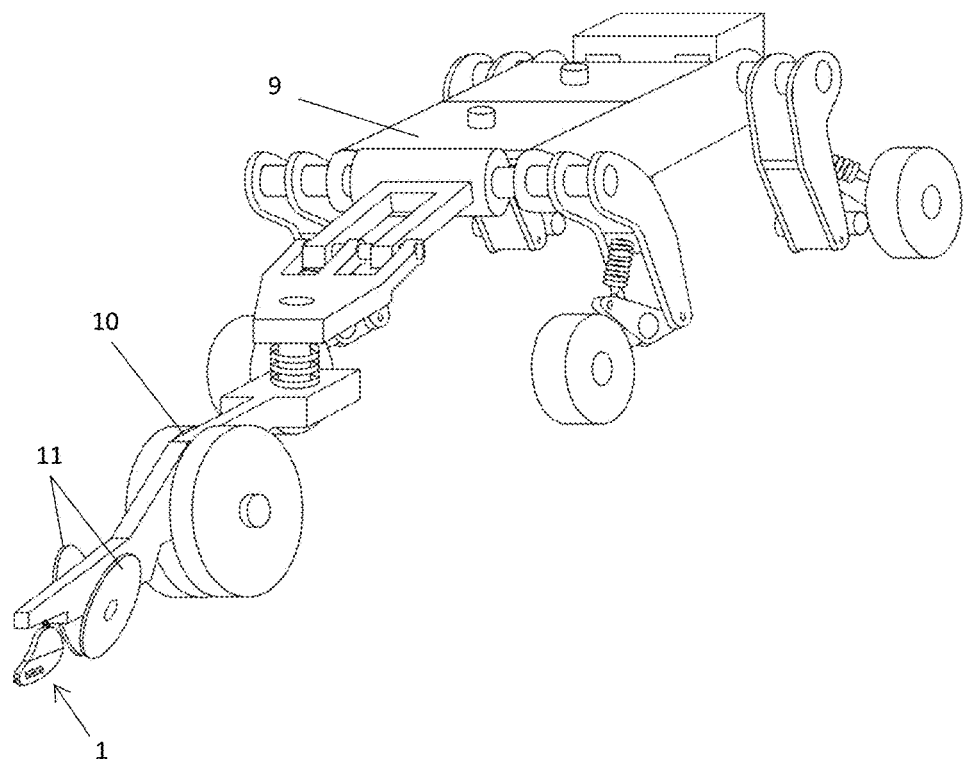
FIG. 13 shows a perspective view of the device of the present invention linked to a row unit that is arranged on a terrestrial robot.
Figure 14:
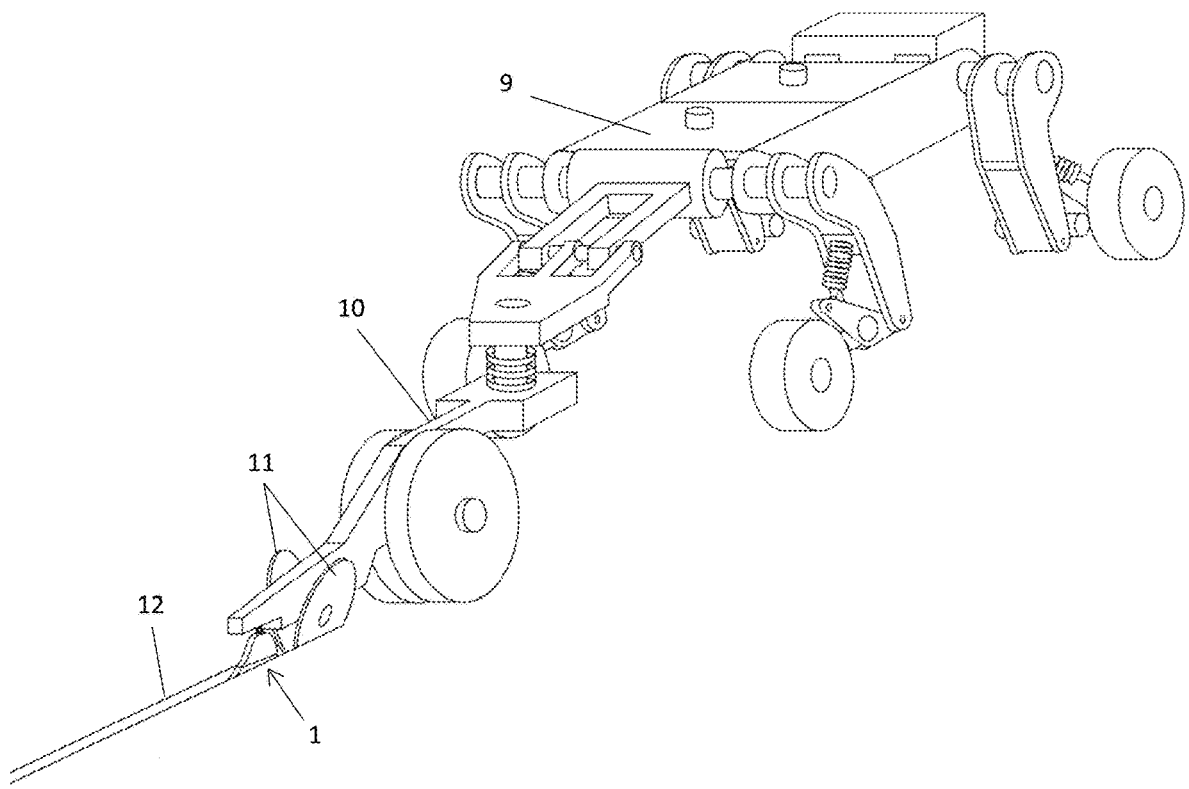
FIG. 14 shows a perspective view of the device of the present invention linked to a row unit that is arranged on a terrestrial robot.
Figure 15:
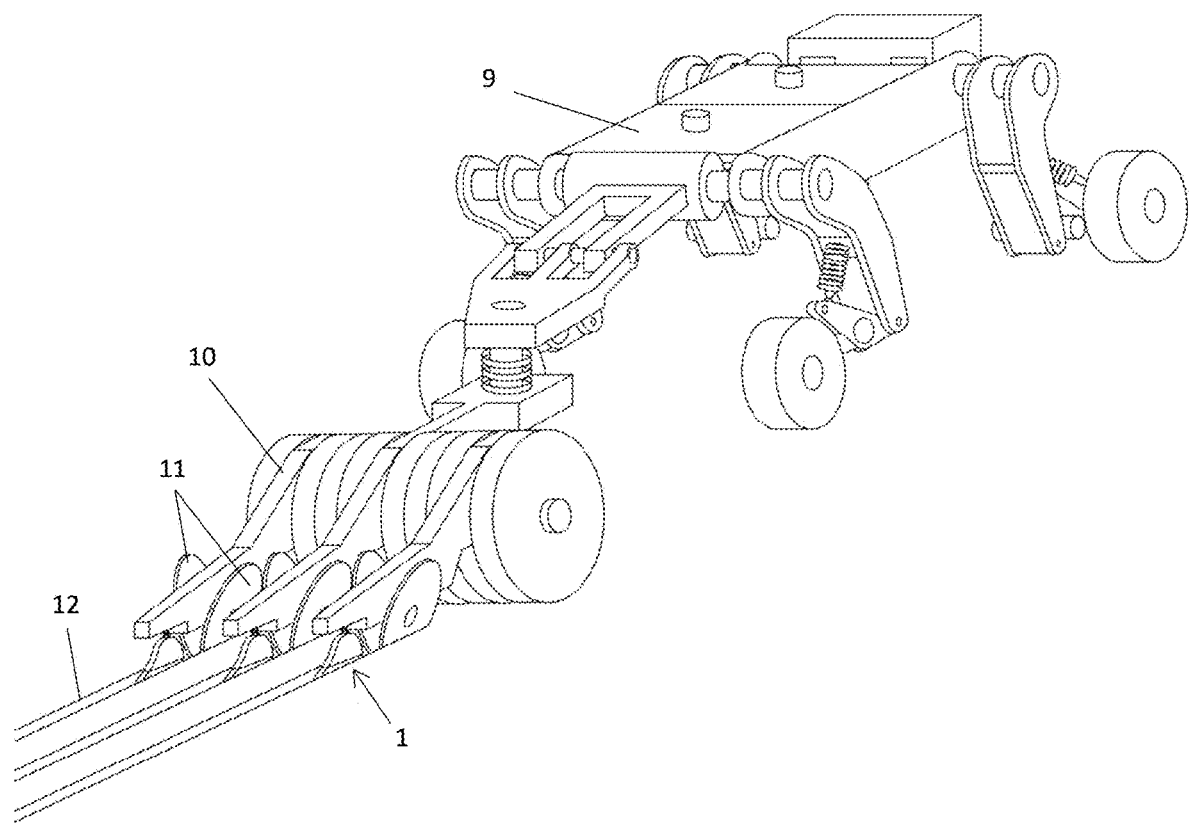
FIG. 15 shows a perspective view of a plurality of devices of the present invention linked to respective row units that are arranged on a terrestrial robot.

FIG. 13 shows a perspective view of device 1 of the present invention linked to a row unit 10 which, in turn, is arranged on a terrestrial robot 9. FIG. 14 shows the device 1 linked to row unit 10 arranged on the terrestrial robot 9 during an operation either of ploughing, in which the terrestrial robot 9, while advancing over a field, makes a furrow 12 by means of the furrow opening discs 11, and wherein device 1 carries out the shaping of the furrow profile into a V-shape; of survey of soil properties, where for such task a furrow 12 is opened to measure the soil properties at a certain depth; of fluid dosage, or a combination of such operations. For its part, FIG. 15 shows the terrestrial robot 9 dragging a plurality of row units 10, which individually are identical to those of FIGS. 13 and 14.

Figure 16:
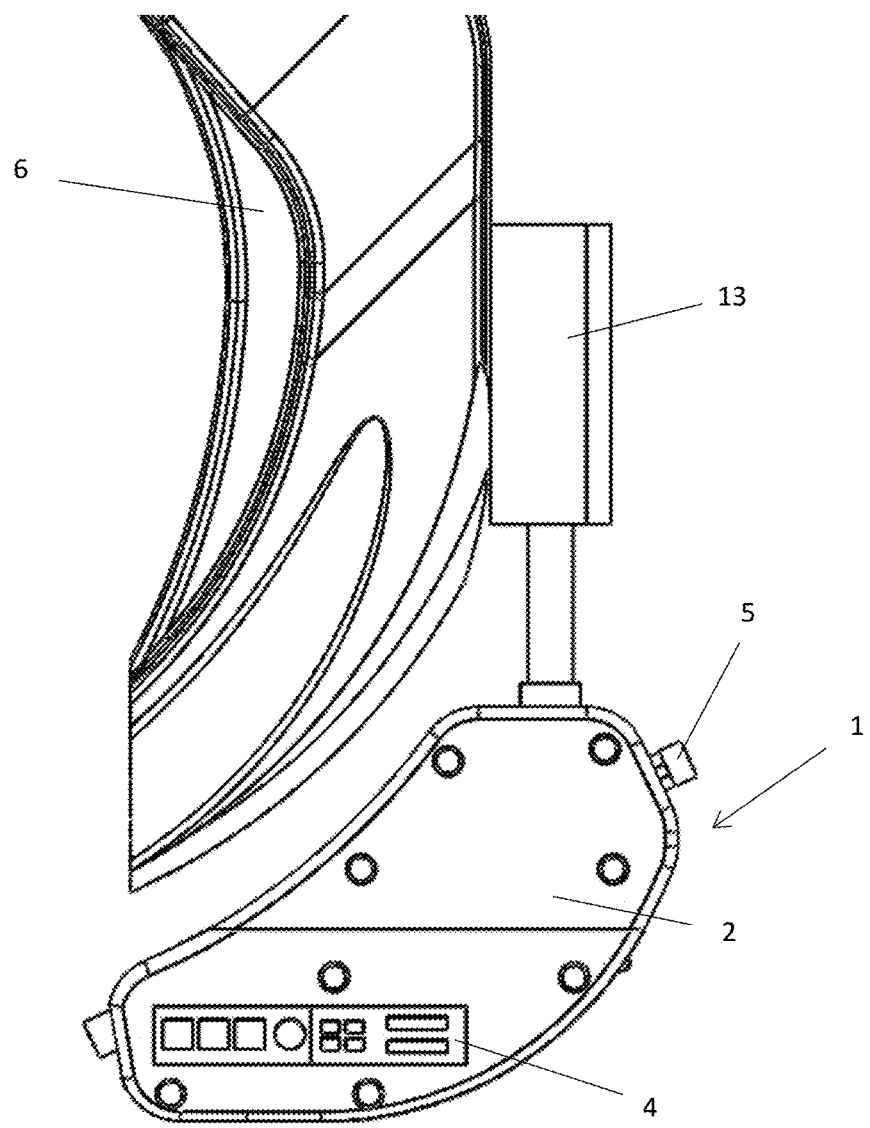
FIG. 16 shows a left-side view of another embodiment of the device of the present invention.

FIG. 16 shows a left-side view of another embodiment of device 1 of the present invention which only differs from the previous embodiment in the damping and biasing means which consist only of a damper 13, without the effect of a spring. Said damper 13, which may be a hydraulic (oil) or pneumatic (air) damper, comprises a body which is linked to the seed tube 6, preferably in a vertical manner, that is, perpendicular to a forward direction of the agricultural vehicle incorporating the device of the present invention. Likewise, the damper 13 is fixed to the upper face of the body 2 through the rod of the damper 13.

Figure 17:
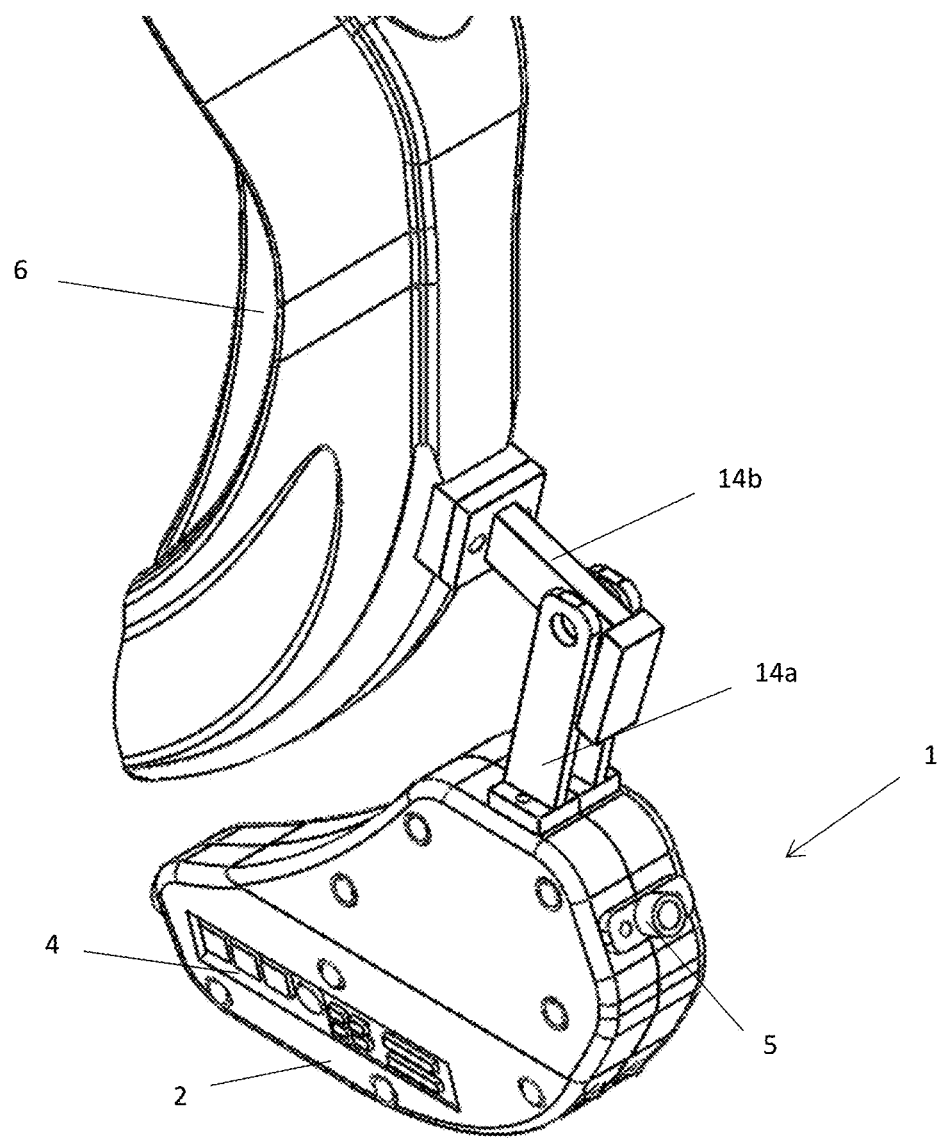
FIG. 17 shows a front perspective view of another embodiment of the device of the present invention.

FIG. 17 shows a front perspective view of another embodiment of device 1 of the present invention whose only difference with the previously described embodiments lies in the damping and biasing means which comprise a coupling arm 14a and a support arm 14b.

The support arm 14b protrudes and extends forward from the seed tube 6 and is configured to allow the coupling arm 14a, which extends from the upper face of body 2 of device 1, to be pivotably coupled to, and supported by, the support arm 14b.

The coupling arm 14a comprises two parallel and spaced apart bars, each having a through-hole at the end furthest from body 2. These holes are collinear with each other and are also collinear with another through-hole that can be located at the end of the support arm 14b furthest from the seed tube 6. Thus, the two bars of the coupling arm 14a are arranged so that the support arm 14b is in the space between the bars of the coupling arm 14a, and the holes in both the bars of the coupling arm 14a and the support arm 14b are collinear so that they form a space that defines a pivoting axis around which device 1 pivots. This enables device 1 to perfectly copy the furrow profile it is shaping. In other words, by means of these damping and biasing means and the possibility of pivoting relative to the pivot axis, device 1 can perfectly copy the profile of the furrow, ensuring contact with the soil of the furrow and being able to raise and avoid objects such as stones or logs.

The hole that defines the pivot axis of device 1 in this embodiment comprises a rubber bushing or a metal torsion spring which, by means of a torsion force, ensures permanent contact with the soil. This rubber bushing or torsion spring can not only be adjusted so that device 1 has a damping effect but can also be adjusted so that the device is fixed, if necessary, for better shaping the soil profile.

Figure 18:
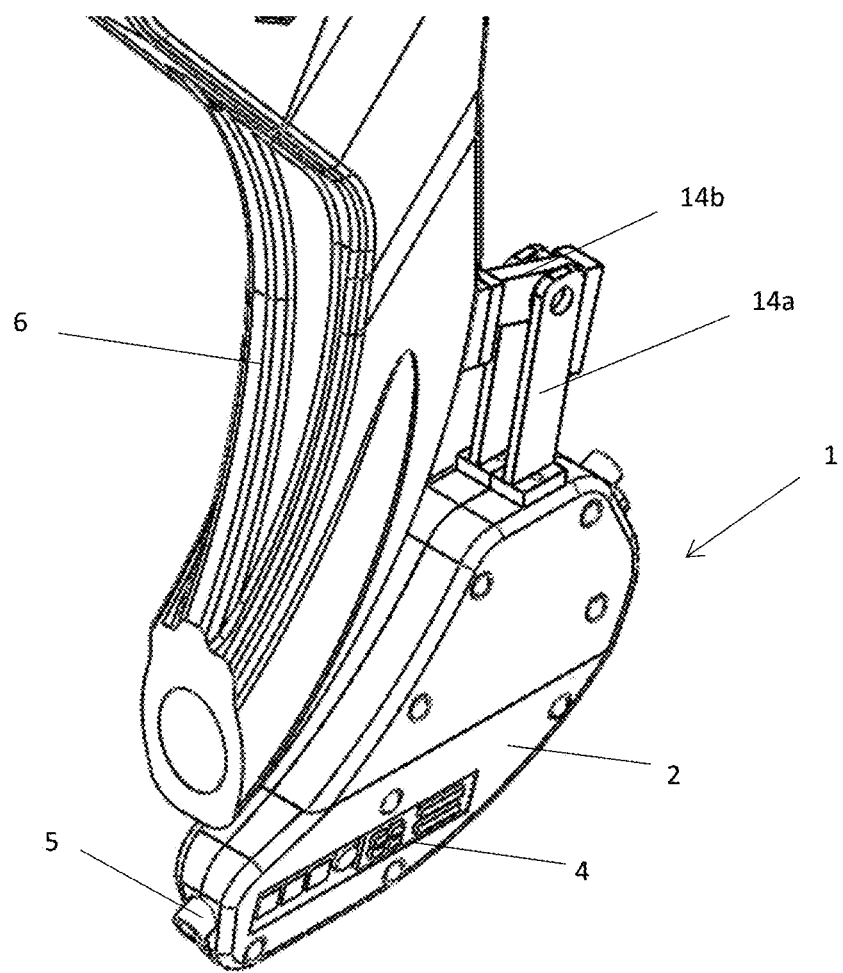
FIG. 18 shows a rear perspective view of the embodiment of the device of FIG. 17.
Figure 19:
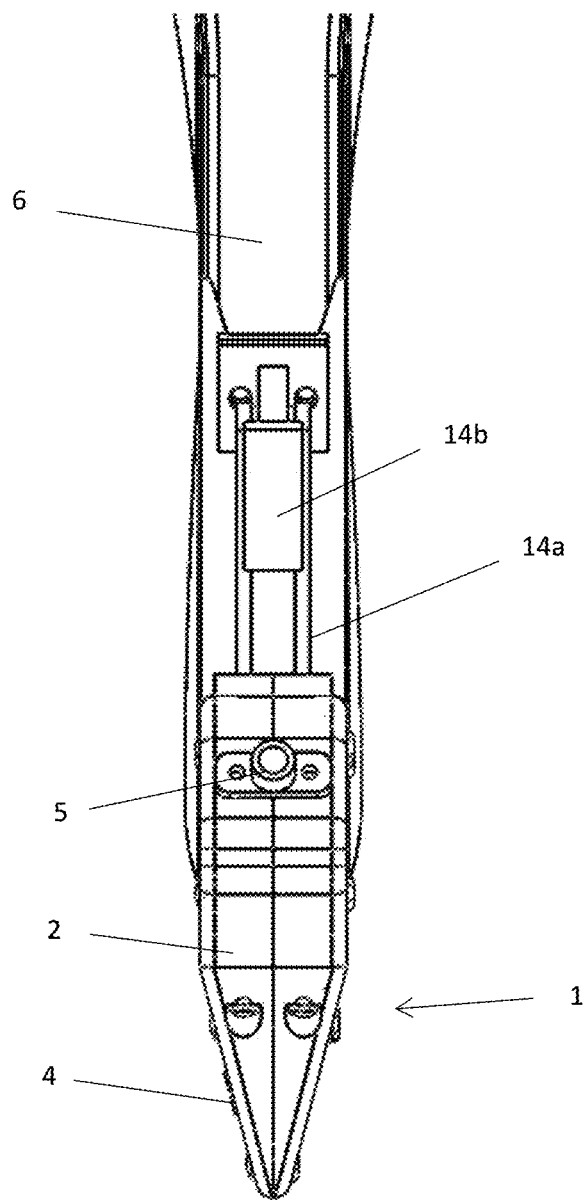
FIG. 19 shows a front view of the embodiment of the device of FIG. 17.
Figure 20:
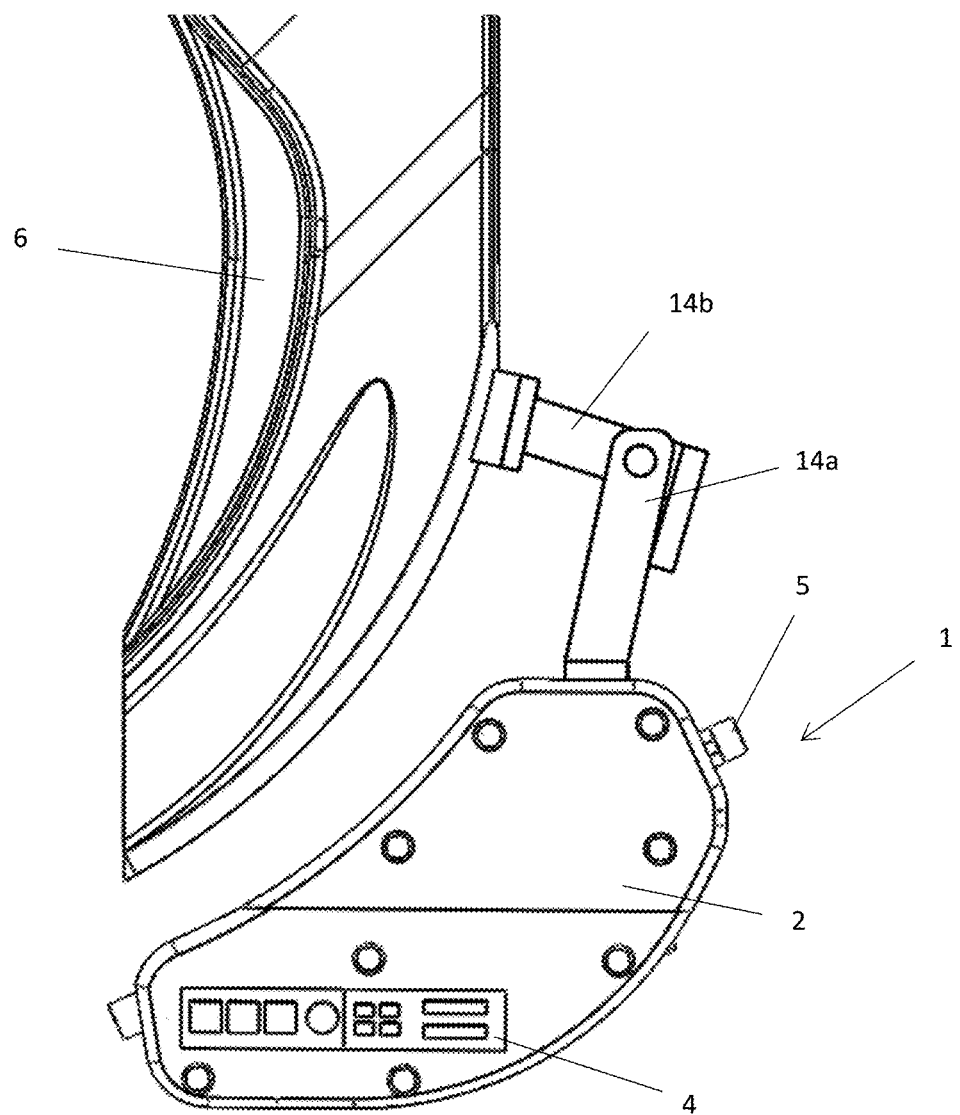
FIG. 20 shows a left-side view of the embodiment of the device of FIG. 17.
Figure 21:
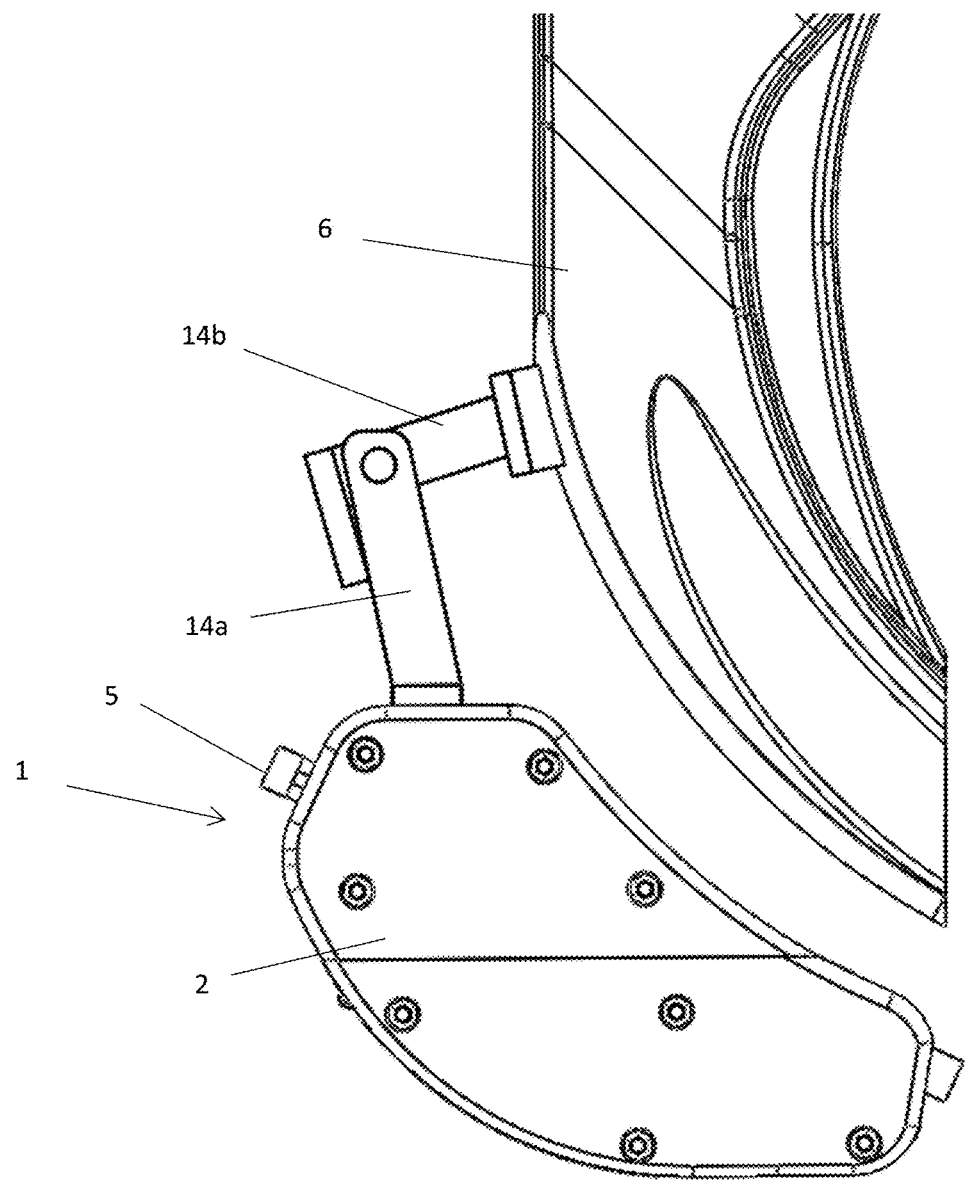
FIG. 21 shows a right-side view of the embodiment of the device of FIG. 17.
Figure 22:
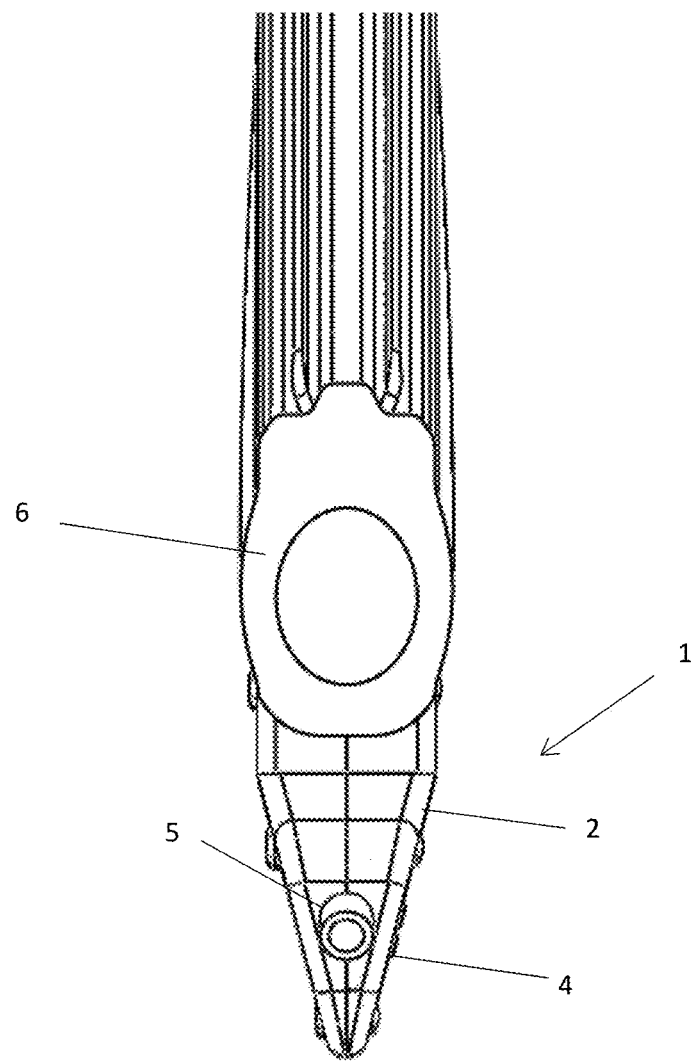
FIG. 22 shows a rear view of the embodiment of the device of FIG. 17.

FIG. 18 shows a rear perspective view of the embodiment of the device shown in FIG. 17. FIGS. 19 and 22 show a front view and a rear view, respectively, of the embodiment of the device of FIG. 17. In particular, it can be seen in each of FIGS. 19 and 22 the inclination of the lower portion of each of the lateral faces of body 2 and how this inclination forms the V-shaped profile of body 2 when it is seen from a longitudinal direction. FIGS. 20 and 21 show a left-side view and right-side view, respectively, of the embodiment of the device of FIG. 17. In particular, FIG. 20 shows the right lateral face and the "crescent" shape of body 2 of device 1, wherein said lateral face comprises sensing means 4. On the other hand, FIG. 21 shows the left lateral face which, in this case, does not comprise sensing means but which could be easily incorporated on the surface thereof, as well as on the front, rear and lower faces of body 2.

Figure 23:
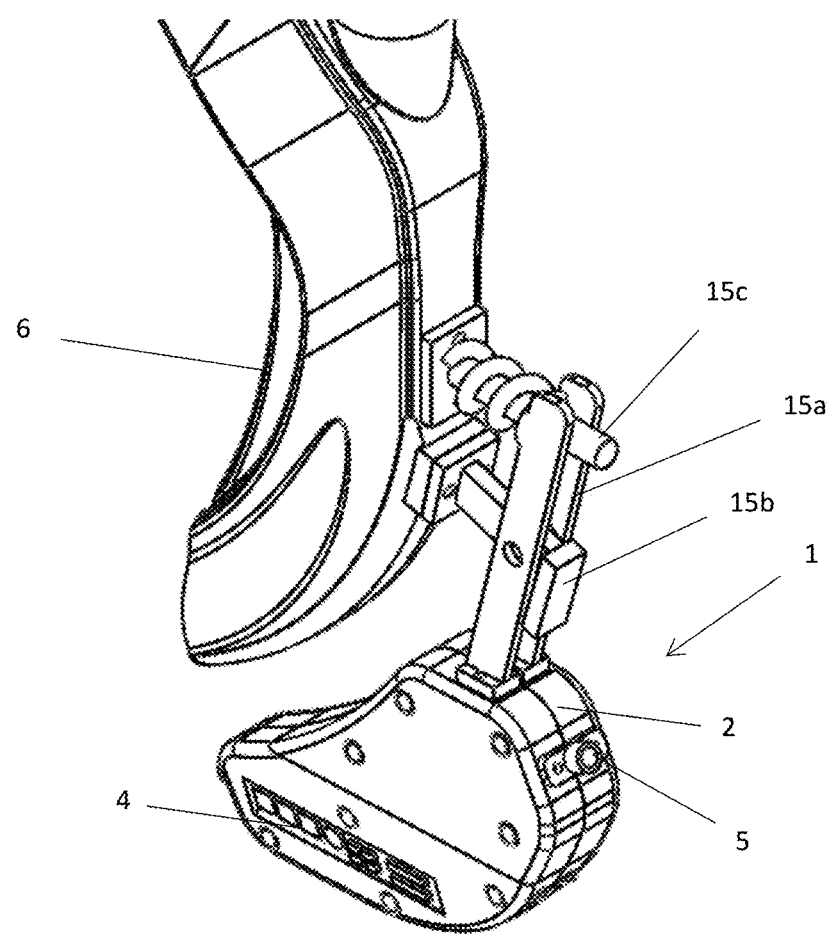
FIG. 23 shows a front perspective view of another embodiment of the device of the present invention.

FIG. 23 shows a front perspective view of a last embodiment of the device 1 of the present invention whose only difference with the previously described embodiments lies in the damping and biasing means which comprise a coupling arm 15a, a support arm 15b and a rod 15c with a spring allowing the damping effect of device 1. Said spring is preferably a metal helical spring.

As in the previous embodiment, i.e. the device embodiment shown in FIGS. 17 to 22, the support arm 15b protrudes and extends forward from the seed tube 6 and allows the coupling arm 15a, which extends from the upper face of the body 2 of device 1, to be pivotably coupled to, and supported by, the support arm 15b.

The coupling arm 15a comprises two parallel and spaced apart bars that extend, and each has a through-hole at a middle part thereof. These holes, as in the previous embodiment, are collinear with each other and are also collinear with another through-hole that can be located at the end of the support arm 15b further away from the seed tube 6. Thus, the two bars of the coupling arm 15a are arranged so that the support arm 15b is in the space between the bars of the coupling arm 15a and the holes of both the bars of the coupling arm 15a and the support arm 15b are collinear so that they form a space that defines a pivoting axis around which the device 1 will pivot.

The two parallel bars of the coupling arm 15a are mechanically connected to the spring of the rod 15c, e.g. by welding, through their ends furthest from body 2 so that the device 1 is able to pivot relative to the pivot axis and that said spring transmits enough load to body 2 of device 1 so that it perfectly copies the furrow profile being shaped, ensuring contact with the soil of the furrow at all times and being able to raise and avoid objects such as stones or logs, as when it runs into these objects the body 2 raises and generates a force that compresses the spring and once the body 2 has passed these objects the spring returns to its original position and consequently also the body 2, due to the elastic potential energy stored by the spring.

Figure 24:
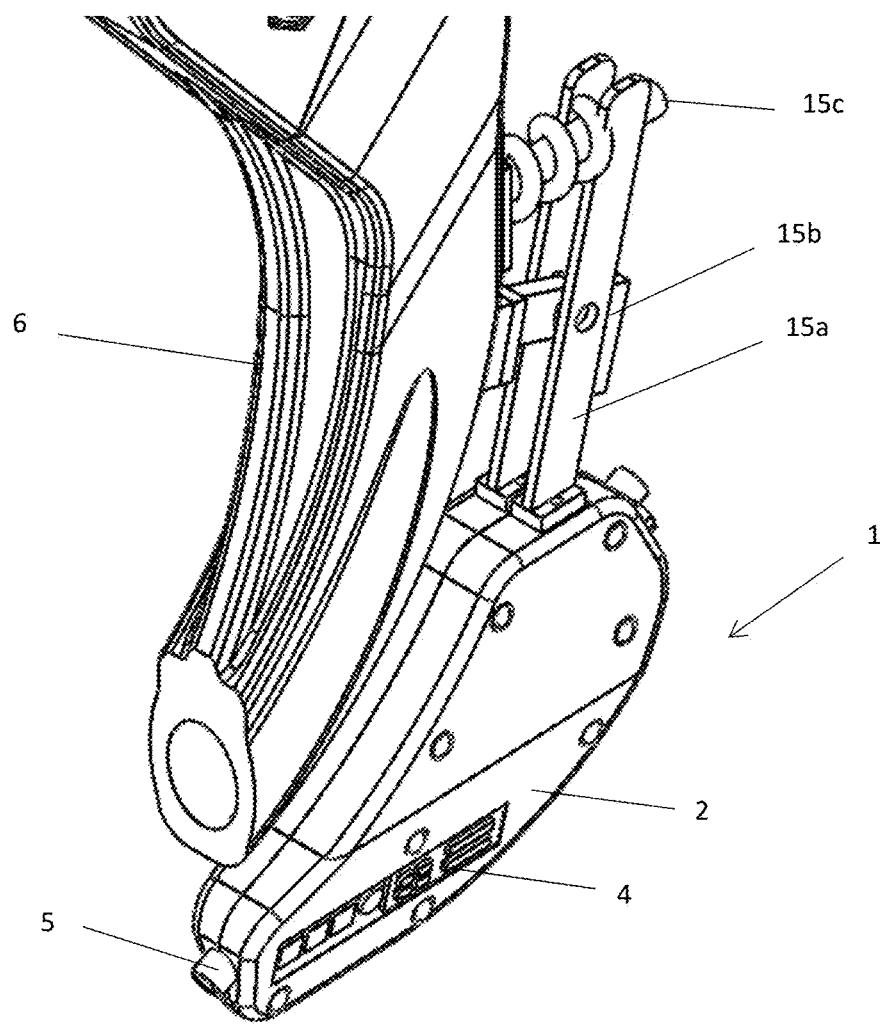
FIG. 24 shows a rear perspective view of the embodiment of the device of FIG. 23.
Figure 25:
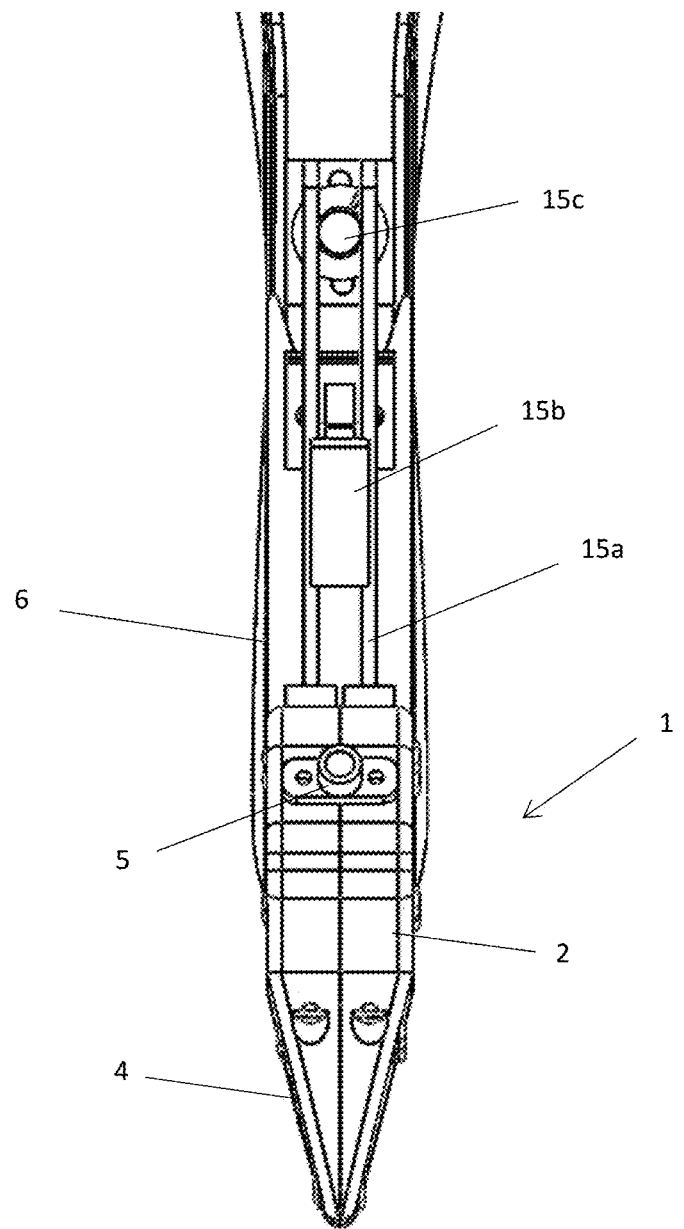
FIG. 25 shows a front view of the embodiment of the device of FIG. 23.
Figure 26:
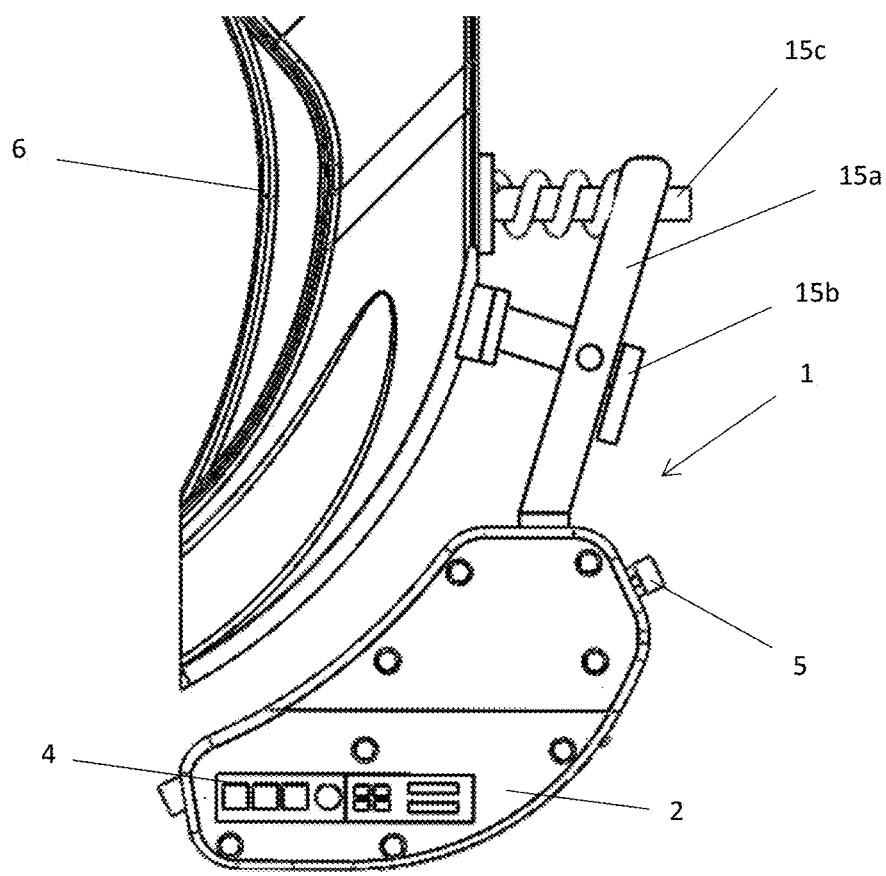
FIG. 26 shows a left-side view of the embodiment of the device of FIG. 23.
Figure 27:
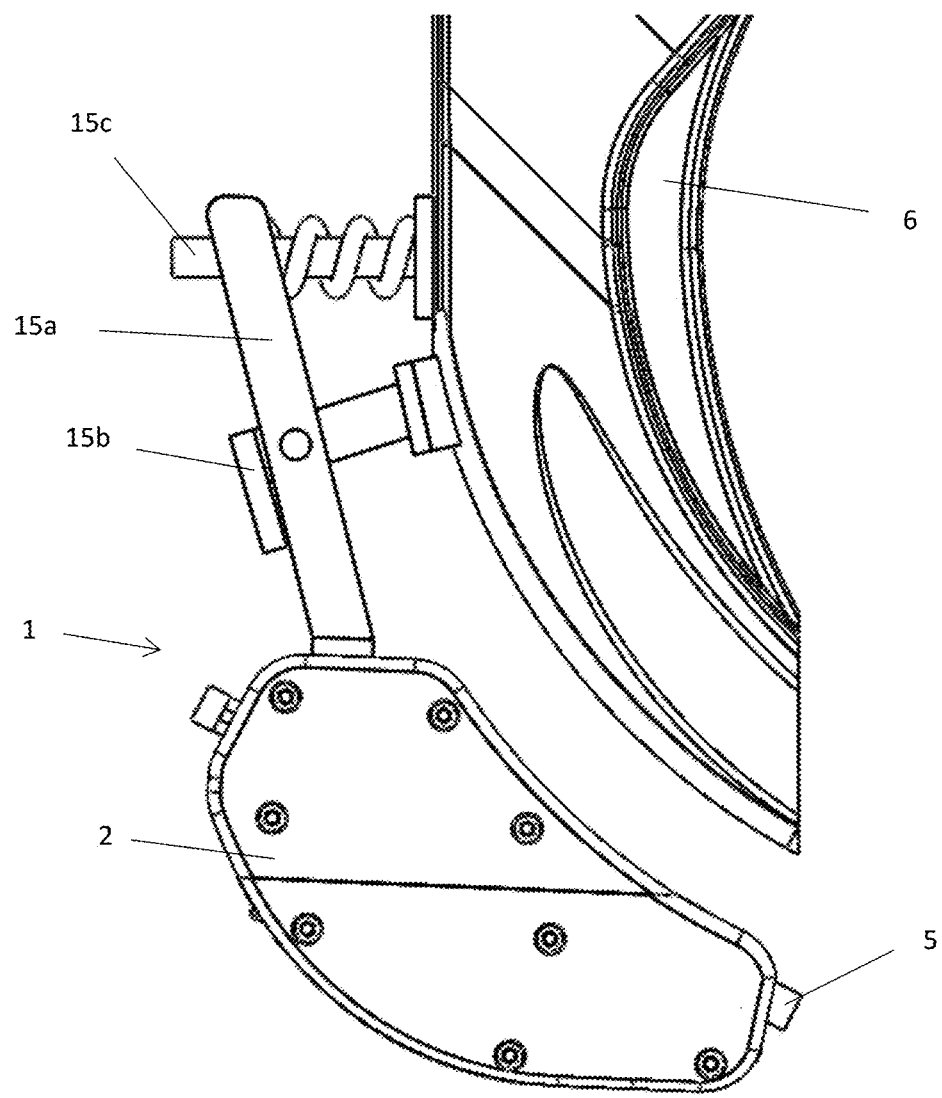
FIG. 27 shows a right-side view of the embodiment of the device of FIG. 23.
Figure 28:
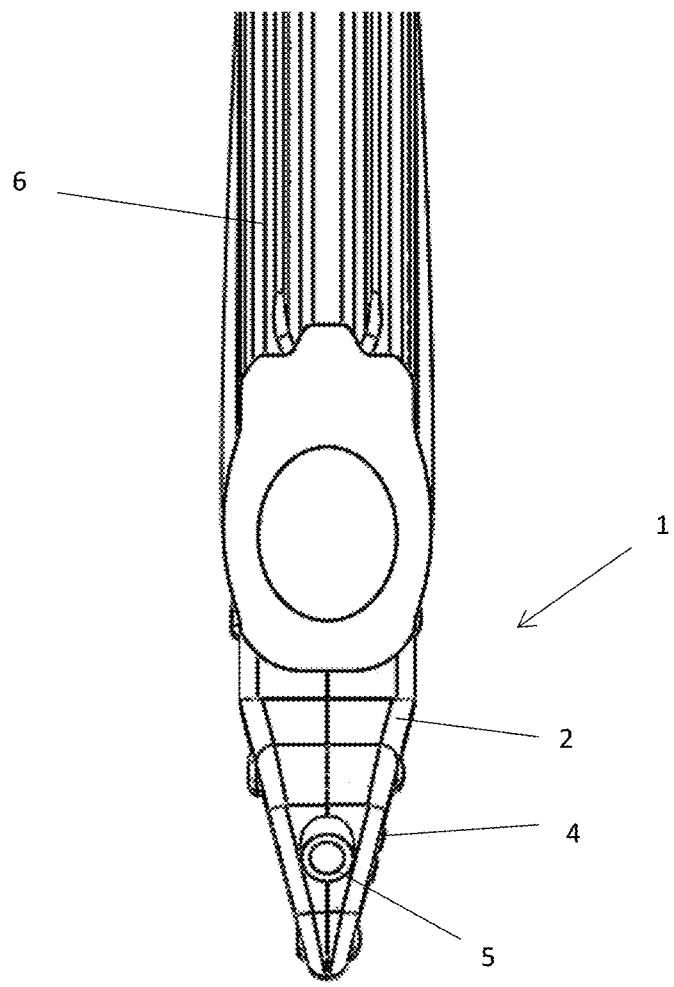
FIG. 28 shows a rear view of the embodiment of the device of FIG. 23.

FIG. 24 shows a rear perspective view of the embodiment of the device shown in FIG. 23. FIGS. 25 and 28 show a front view and a rear view, respectively, of the embodiment of the device of FIG. 23. In particular, it can be seen in each of FIGS. 25 and 28 the inclination of the lower portion of each of the lateral faces of body 2 and how this inclination forms the V-shaped profile of body 2 when it is seen from a longitudinal direction. FIGS. 26 and 27 show a left-side view and right-side view, respectively, of the embodiment of the device of FIG. 23. In particular, FIG. 26 shows the right lateral face and the "crescent" shape of body 2 of device 1, wherein said lateral face comprises sensing means 4. On the other hand, FIG. 27 shows the left lateral face which, in this case, does not comprise sensing means but which could be easily incorporated on the surface thereof, as well as on the front, rear and lower faces of body 2.

For each of the embodiments described above, the electronic components necessary to perform the sensing or survey of the soil properties are disposed inside the body of the device, wherein said electronic components may comprise a sensing unit, which acts as a control unit and can be a microcontroller, and other components, for example, a PCB board among others. In particular, the sensing unit commands the different components located on the faces of the body of the device of the present invention, being able to select which components to use and which not; and receives the information obtained or sensed by said components, which is then sent to a processing unit with which the sensing unit is in data communication so that the processing unit can process and store said information. The processed and stored information can then be shown on a display or user interface. The processing unit can be located, for example, within the device of the present invention, in the cabin of the agricultural vehicle, in an autonomous terrestrial robot, etc., and the connection between the sensing means and the sensing unit, and the data communication between the sensing unit and the data processing unit, can be done either wired or wireless.

The data can be processed with machine learning methods, such as artificial neural networks, on the processing unit. After data processing, depending on the components incorporated into the body of the device of the present invention, the following parameters can be obtained: amount of organic matter, moisture, nitrogen, potassium, sulphur, zinc, calcium, magnesium, phosphorus, sodium, chlorine, iron, clay, sand, silt, crop residues, salinity, conductivity, pH, soil temperature and other soil properties. Based on the parameters obtained it can be decided in real time whether to dose fluid, for example water or some agrochemical compound, on the points measured in the soil by means of the conduit(s) comprising the device of the present invention, and whether or not to sow seed on those measured points.

As previously mentioned, all these parameters obtained in real time can be shown on the display or user interface, in numerical form and/or on colored surface maps taking into account the coordinates of a GPS/GNSS module, which is in data communication with the processing unit so that each of the obtained measurements can be georeferenced.

The device of the present invention is designed to be compact, light, practical and easy to mount, and can be incorporated into an autonomous vehicle or agricultural machine, and encompasses various functions such as V-shaping the furrow profile and measuring a wide range of soil properties accurately, in comparison to known devices in the state of the art. In addition, it allows dosing compounds such as liquids or semi-liquids automatically and precisely according to the obtained measurements.

The embodiments described in an illustrative manner herein may be carried out appropriately in the absence of any element or elements, limitation or limitations, not specifically described herein. Thus, for example, the expressions "comprising", "including", "containing", etc. should be interpreted broadly and without limitation. Additionally, the terms and expressions employed herein have been used as terms of description and not of limitation and there is no intention in the use of such terms and expressions to exclude any equivalent of the characteristics shown and described or portions thereof, but it is recognized that various modifications are possible within the scope of the invention. Thus, it should be understood that although the present embodiments have been specifically described through preferred embodiments and optional features, modifications and variations thereof may be conceived by those skilled in the art and that such modifications and variations are considered within the scope of the invention. Each of the species and narrower sub-generic groups within the generic description are also part of the invention. Additional embodiments will be evident to a skilled person in the art from the following claims.

The invention claimed is:

1. A device for shaping a profile of a furrow, sensing soil properties and dosing fluids in the soil of an agricultural field, comprising:
    a body comprising an upper portion and a lower portion defining a right lateral face and a left lateral face that are laterally opposite, a front face and a rear face that are longitudinally opposite, and an upper face and a lower face that are vertically opposite, wherein the laterally opposite faces at the lower portion of the body are angled relative to a vertical direction forming a V-shaped profile cross section for V-shaping furrows;
    damping and biasing means linked to the upper face of the body;
    at least one fluid dosing conduit comprising an inlet and an outlet, and being longitudinally arranged within the body;
    sensing means on at least one face of the body for measuring soil properties; and
    a sensing unit for commanding the sensing means and receiving information thereof,
    wherein the device is linked to a seed tube of a planter row unit, in front of the seed tube, wherein the placement of the device in the seed tube allows shaping the furrow profile, sensing soil properties, and dosing fluids into the soil before depositing the seed into the furrow.

2. The device according to claim 1, wherein in that the laterally opposite faces at the lower portion are angled between 5° and 25° relative to a vertical direction.

3. The device according to claim 1, wherein the damping and biasing means comprise a helical spring and a damper.

4. The device according to claim 1, wherein the damping and biasing means comprise a damper.

5. The device according to claim 1, wherein the damping and biasing means comprise a coupling arm and a support arm, wherein the coupling arm comprises two parallel and spaced apart bars that are linked to the body at one end and each has a through-hole at another end, and wherein the support arm is between the parallel bars of the coupling arm supporting the latter and has a through-hole collinear with the coupling arm holes, thereby forming together a space that defines a pivoting axis and comprises a rubber bushing or a metal torsion spring.

6. The device according to claim 1, wherein the damping and biasing means comprise a coupling arm, a support arm and a rod with a spring, wherein the coupling arm comprises two parallel and spaced apart bars that are linked to the body at one end and each has a through-hole at a middle part thereof, wherein the support arm is between the parallel bars of the coupling arm supporting the latter and has a through-hole collinear with the coupling arm holes thereby forming together a space that defines a pivoting axis and wherein other ends of the parallel bars make contact with the rod spring.

7. The device according to claim 1, wherein the device is mounted on a planter row unit or autonomous terrestrial robot.

8. The device according to claim 1, wherein the sensing means comprise one or more components selected from the following group: sensors for measuring electrical properties of the soil; radiation emitters and receptors in the visible and near-infrared radiation spectrum; contact or non-contact surface temperature sensors; electrochemical sensors and an inertial measurement unit.

9. The device according to claim 8, wherein the electrochemical sensors comprise a wetting system and a protection system.

10. The device according to claim 8, wherein the device allows measuring the amount of organic matter, moisture, nitrogen, potassium, sulphur, zinc, calcium, magnesium, phosphorus, sodium, chlorine, iron, clay, sand, silt, crop residues, salinity, conductivity, pH and soil temperature.

11. The device according to claim 1, wherein the sensing means are placed on the laterally opposite faces, on the front face, on the rear face and on the lower face of the body.

12. The device according to claim 1, wherein the at least one dosing conduit doses water or agrochemicals in liquid or semi-liquid form.

13. The device according to claim 12, wherein the at least one dosing conduit comprises a fluid diffusion means at the outlet.

14. The device according to claim 12, wherein the at least one dosing conduit is in fluid communication with an injection system and at least one reservoir, which allow the dosing and storage, respectively, of the water or agrochemicals.

15. The device according to claim 11, wherein the at least one dosing conduit is diagonally and downwardly arranged within the body, from the front face to the rear face.

16. The device according to claim 1, wherein the sensing unit sends the information received to a processing unit for processing and storing said information.

17. The device according to claim 16, wherein the processing unit is in data communication with a GPS/GNSS module that allows georeferencing each of the measurements made.

18. A seed drill agricultural vehicle, comprising a device for shaping the profile of a furrow, sensing soil properties and dosing fluids according to claim 1.

19. A device for shaping a profile of a furrow, sensing soil properties and dosing fluids in the soil of an agricultural field, comprising:

a body comprising an upper portion and a lower portion defining a right lateral face and a left lateral face that are laterally opposite, a front face and a rear face that are longitudinally opposite, and an upper face and a lower face that are vertically opposite, wherein the laterally opposite faces at the lower portion of the body are angled relative to a vertical direction forming a V-shaped profile cross section for V-shaping furrows;

damping and biasing means linked to the upper face of the body;

at least one fluid dosing conduit comprising an inlet and an outlet, and being longitudinally arranged within the body;

sensing means on at least one face of the body for measuring soil properties; and a sensing unit for commanding the sensing means and receiving information thereof, wherein the damping and biasing means comprise a coupling arm and a support arm, wherein the coupling arm comprises two parallel and spaced apart bars that are linked to the body at one end and each has a through-hole at another end, and wherein the support arm is between the parallel bars of the coupling arm supporting the latter and has a through-hole collinear with the coupling arm holes, thereby forming together a space that defines a pivoting axis and comprises a rubber bushing or a metal torsion spring.

20. A device for shaping a profile of a furrow, sensing soil properties and dosing fluids in the soil of an agricultural field, comprising:

a body comprising an upper portion and a lower portion defining a right lateral face and a left lateral face that are laterally opposite, a front face and a rear face that are longitudinally opposite, and an upper face and a lower face that are vertically opposite, wherein the laterally opposite faces at the lower portion of the body are angled relative to a vertical direction forming a V-shaped profile cross section for V-shaping furrows;

damping and biasing means linked to the upper face of the body;

at least one fluid dosing conduit comprising an inlet and an outlet, and being longitudinally arranged within the body;

sensing means on at least one face of the body for measuring soil properties; and a sensing unit for commanding the sensing means and receiving information thereof, wherein the damping and biasing means comprise a coupling arm, a support arm and a rod with a spring, wherein the coupling arm comprises two parallel and spaced apart bars that are linked to the body at one end and each has a through-hole at a middle part thereof, wherein the support arm is between the parallel bars of the coupling arm supporting the latter and has a through-hole collinear with the coupling arm holes thereby forming together a space that defines a pivoting axis and wherein other ends of the parallel bars make contact with the rod spring.

* * * * *